United States Patent
Srivastava et al.

(10) Patent No.: US 12,463,863 B1
(45) Date of Patent: Nov. 4, 2025

(54) AGENTICALLY-ORCHESTRATED FOUNDATIONAL MODELS FOR CLOUD ARCHITECTURE DESIGN

(71) Applicant: Google LLC, Mountain View, CA (US)

(72) Inventors: Aayush Srivastava, New York, NY (US); Alison Marlene Andrews, Stonington, CT (US); Priyanka Vergadia, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/651,866

(22) Filed: May 1, 2024

(51) Int. Cl.
*H04L 41/0803* (2022.01)
*H04L 67/10* (2022.01)

(52) U.S. Cl.
CPC .......... *H04L 41/0803* (2013.01); *H04L 67/10* (2013.01)

(58) Field of Classification Search
CPC .. H04L 41/0813; H04L 41/0806; H04L 67/10
USPC ........................................................ 709/220
See application file for complete search history.

(56) References Cited

U.S. PATENT DOCUMENTS

| | | | | |
|---|---|---|---|---|
| 10,332,384 B1 * | 6/2019 | Schryer | ............... | G06N 5/025 |
| 2017/0322787 A1 * | 11/2017 | Patidar | ............... | G06F 8/61 |
| 2019/0068445 A1 * | 2/2019 | Chauhan | ............... | H04L 67/10 |
| 2019/0342166 A1 * | 11/2019 | Chaware | ............... | H04L 41/0806 |
| 2022/0413932 A1 * | 12/2022 | Telang | ............... | G06F 9/505 |
| 2023/0186117 A1 * | 6/2023 | Durvasula | ............... | G06N 3/09 |
| | | | | 706/12 |

FOREIGN PATENT DOCUMENTS

CN 114553865 B * 5/2023 ............ H04L 67/10

* cited by examiner

*Primary Examiner* — Ruolei Zong
(74) *Attorney, Agent, or Firm* — DORITY & MANNING P.A.

(57) ABSTRACT

A set of inputs is obtained, including user response information including information indicative of cloud architecture requirements for a cloud architecture to fulfill, and proposed architecture information indicative of a proposed cloud architecture including proposed generic component placeholders for components necessary to meet the cloud architecture requirements. The set of inputs is processed with agentic orchestration models to obtain a role output including component selection information indicative of cloud components selected for the proposed generic component placeholders. For each of the proposed generic component placeholders, the component selection information selects a particular cloud component from a set of candidate cloud components. Each of the agentic orchestration models includes a machine-learned model prompted to fulfill a corresponding cloud architecting role. Based on the component selection information, information indicative of the cloud components selected for the proposed generic component placeholders is provided to a user device.

20 Claims, 10 Drawing Sheets

AGENTICALLY-ORCHESTRATED FOUNDATIONAL MODELS FOR CLOUD ARCHITECTURE DESIGN

FIELD

The present disclosure relates generally to model-based selection of cloud services or components for cloud-based architectures. More specifically, the present disclosure relates to utilizing foundational models representing particular agent roles (e.g., developers, designers, etc.) to select services for generic cloud component placeholders that fulfill certain architecture requirements.

BACKGROUND

Cloud computing generally refers to large, distributed networks of computing resources (e.g., Central Processing Units (CPUs), memory, storage, etc.) used to deliver computing services (e.g., servers, storage, databases, networking, software, etc.) over the internet. Cloud computing systems enable users to access resources and applications from anywhere with an internet connection, without the need for physical infrastructure or on-premises hardware. Cloud computing systems are conventionally implemented in partnership with cloud computing platforms. Generally, a cloud computing platform will own a distributed network of computing resources that can be leveraged by users to implement cloud systems that the user develops. In addition, many cloud computing systems leverage virtualization technology, such as containers or virtual machines, to more efficiently allocate computing resources to users. For example, rather than assigning a CPU core exclusively to a user, a cloud platform may instantiate multiple virtual machines to implement cloud computing systems for multiple users, and the virtual machine can utilize the CPU core on an as-needed basis.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes obtaining, by a computing system comprising one or more computing devices, a set of inputs comprising user response information comprising information indicative of cloud architecture requirements for a cloud architecture to fulfill, and proposed architecture information indicative of a proposed cloud architecture comprising a plurality of proposed generic component placeholders for components necessary to meet the cloud architecture requirements. The method includes processing, by the computing system, the set of inputs with a plurality of agentic orchestration models to obtain a role output comprising component selection information indicative of a plurality of cloud components selected for the plurality of proposed generic component placeholders, wherein, for each of the plurality of proposed generic component placeholders, the component selection information selects a particular cloud component from a set of candidate cloud components, and wherein each of the plurality of agentic orchestration models comprises a machine-learned model prompted to fulfill a corresponding cloud architecting role of a plurality of cloud architecting roles. The method includes, based on the component selection information, providing, by the computing system, information indicative of the plurality of cloud components selected for the plurality of proposed generic component placeholders to a user device associated with the user response information.

Another example aspect of the present disclosure is directed to a computing system. The computing system includes one or more processor devices and one or more tangible, non-transitory computer readable media storing computer-readable instructions that when executed by the one or more processor devices cause the computing system to perform operations. The operations include obtaining a set of inputs comprising user response information comprising information indicative of cloud architecture requirements for a cloud architecture to fulfill, and proposed architecture information indicative of a proposed cloud architecture comprising a plurality of proposed generic component placeholders for components necessary to meet the cloud architecture requirements. The operations include processing the set of inputs with a plurality of agentic orchestration models to obtain a role output comprising component selection information indicative of a plurality of cloud components selected for the plurality of proposed generic component placeholders, wherein, for each of the plurality of proposed generic component placeholders, the component selection information selects a particular cloud component from a set of candidate cloud components, and wherein each of the plurality of agentic orchestration models comprises a machine-learned model prompted to fulfill a corresponding cloud architecting role of a plurality of cloud architecting roles. The operations include, based on the component selection information, generating control configuration information indicative of the plurality of cloud components selected for the plurality of proposed generic component placeholders.

Another example aspect of the present disclosure is directed to one or more tangible, non-transitory computer readable media storing computer-readable instructions that when executed by one or more processor devices cause the one or more processor devices to perform operations. The operations include obtaining a set of inputs comprising user response information comprising information indicative of cloud architecture requirements for a cloud architecture to fulfill and proposed architecture information indicative of a proposed cloud architecture comprising a plurality of proposed generic component placeholders for components necessary to meet the cloud architecture requirements. The operations include processing the set of inputs with a plurality of agentic orchestration models to obtain a role output comprising component selection information indicative of a plurality of cloud components selected for the plurality of proposed generic component placeholders, wherein, for each of the plurality of proposed generic component placeholders, the component selection information selects a particular cloud component from a set of candidate cloud components, and wherein each of the plurality of agentic orchestration models comprises a machine-learned language model prompted to fulfill a corresponding cloud architecting role of a plurality of cloud architecting roles. The operations include, based on the component selection information, generating configuration information indicative of the plurality of cloud components selected for the plurality of proposed generic component placeholders.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
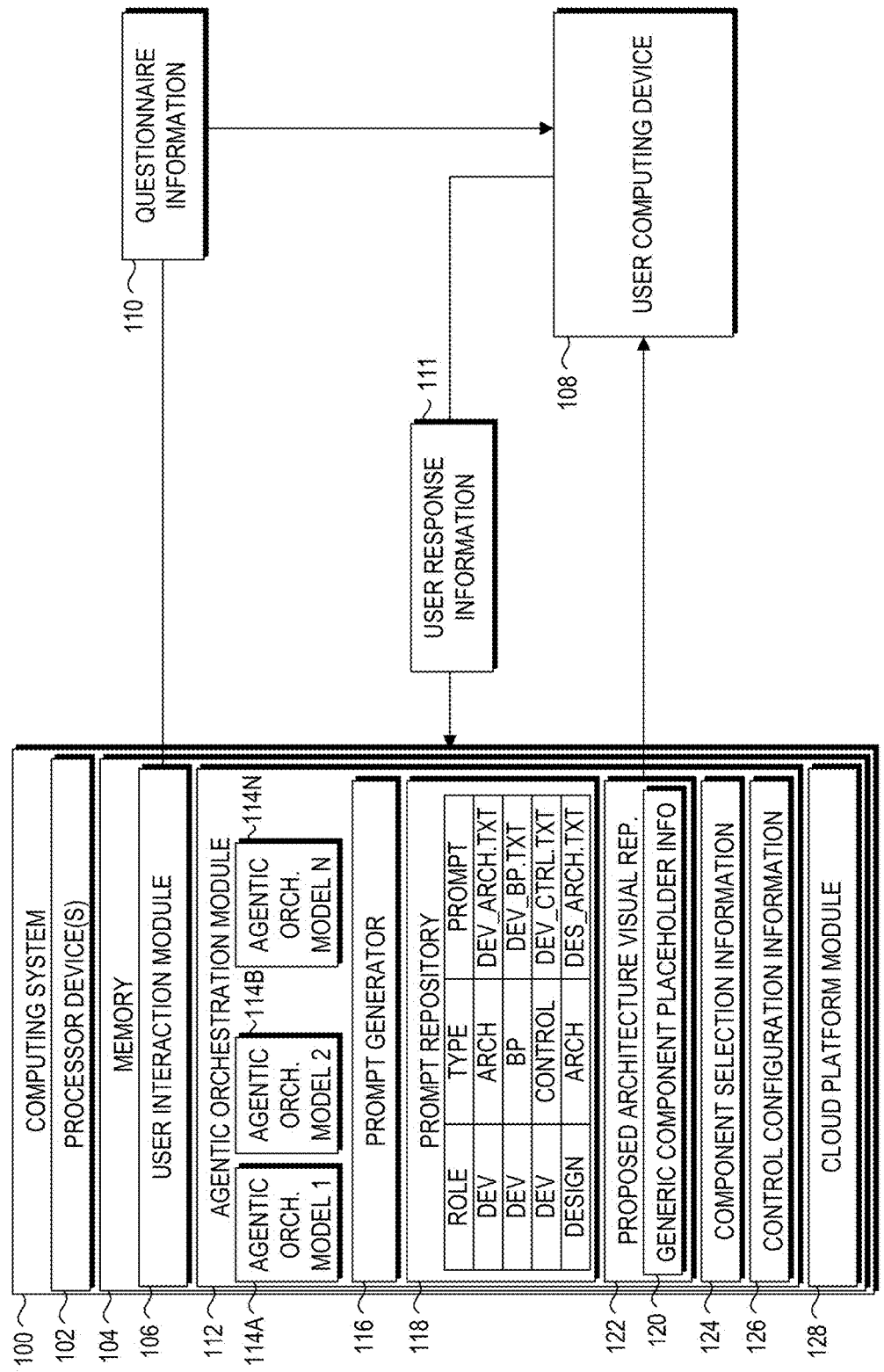
FIG. 1 depicts an overview block diagram of a computing system for agentically-orchestrated foundational models for cloud architecture development according to some implementations of the present disclosure.

Reference numerals that are repeated across plural figures are intended to identify the same features in various implementations.

DETAILED DESCRIPTION

Overview

Generally, the present disclosure is directed to utilizing foundational models representing particular agent roles (e.g., developers, designers, etc.) to select services for generic cloud component placeholders that fulfill certain architecture requirements. More specifically, cloud computing systems generally refer to distributed networks of computing resources used to deliver computing services over the internet. Cloud computing systems provide a number of advantages, such as enabling users to access resources and applications from anywhere with an internet connection, and more efficient allocation of computing resources via virtualization technologies. Cloud computing systems are conventionally implemented in partnership with cloud computing platforms. If a user wishes to create a cloud computing system, the user can develop a cloud architecture for a cloud system and then partner with a cloud computing platform to implement the cloud architecture using the distributed network of computing resources owned by the cloud computing platform.

However, cloud architectures are very complex, and development of such architectures can be prohibitively difficult. In particular, developing robust cloud systems generally requires a number of subject matter experts in cloud architecture, cloud infrastructure, cloud security, networking, computer science, etc. to work in concert to develop such a system. Furthermore, even with access to such subject matter experts, development of cloud systems can be prohibitively time consuming. Finally, cloud architectures designed without the expertise provided by subject matter experts are usually substantially more vulnerable to security exploits and malicious actors. Due to these hurdles, many smaller entities lack the resources to implement robust cloud systems, and are thus unable to leverage the many advantages provided by cloud computing. As such, a technique to create cloud architectures more efficiently and effectively would provide a variety of benefits.

Accordingly, implementations described herein propose agentically-orchestrated foundational models to select components or services for generic cloud component placeholders that fulfill certain architecture requirements. As described herein, "agentically orchestrated" models generally refer to machine-learned model instances that are prompted to conversationally perform a particular role associated with cloud architecture development (e.g., designers, architects, security engineers, etc.). Specifically, instances of agentic orchestration models can refer to instances of machine-learned models. For example, the agentic orchestration models can be or otherwise include instances of Large Foundational Models (LFMs) (e.g., large language models, etc.) which have been trained using large corpuses of training data that includes extensive information related to cloud architecture development (e.g., from subject matter experts, etc.).

As an example, a user who wishes to develop a cloud architecture may provide user response information (e.g., responses to a questionnaire, etc.) that indicates certain cloud architecture requirements for the cloud architecture to fulfill, such as a maximum number of connections, preferred security standards, necessary storage resources, necessary compute resources, etc. A first agentic orchestration model prompted to fulfill a particular role (e.g., a cloud architect role) can process the user response information to generate a role output that indicates proposed generic component placeholders necessary to meet the cloud architecture requirements. The generic component placeholders can serve as generic "placeholders" for functions necessary for cloud architectures. Examples of generic component placeholders can include a "database" placeholder, a "storage" placeholder, a "firewall" placeholder, etc.

A second agentic orchestration model prompted to fulfill a different role (e.g., a cloud design role) can process the user response information alongside the role output from the first agentic orchestration model to obtain a second role output. The role output can correspond to the role fulfilled by the second agentic orchestration model. For example, if the user response information indicates that the user wishes to receive proposed cloud components, the second agentic orchestration model can be prompted to fulfill a solutions architect role, and the role output can include configuration information indicative of cloud components selected for the proposed generic component placeholders. Examples of cloud components include a particular database software (e.g., selected for the "database" placeholder), a particular type of firewall software or service provider (e.g., selected for the "firewall" placeholder), etc.

Agentic orchestration models can be further leveraged to perform a variety of other cloud architecture development roles to obtain a variety of different role outputs. Examples of other role outputs include comparison outputs (e.g., a comparison between a proposed cloud architecture and a current cloud architecture), validation outputs (e.g., validating that a proposed cloud architecture is viable), control outputs (e.g., suggested security controls for a proposed cloud architecture), etc. In such fashion, by leveraging LFMs trained with such knowledge by prompting the LFMs to emulate particular roles, implementations described herein can develop cloud architectures for users while obviating many of the inefficiencies associated with cloud architecture development.

Aspects of the present disclosure provide a number of technical effects and benefits. As one example technical effect and benefit, implementations described herein can substantially reduce the resources required to develop cloud architectures. In addition, implementations described herein can be utilized to validate and verify existing architectures, thus improving efficiency and ensuring that security vulnerabilities are discovered. For example, assume that a user wishes to develop a cloud architecture to provide a particular service. Further assume that the user lacks sufficient resources to develop such a cloud architecture. Using conventional techniques, the user may be forced to develop a sub-optimal architecture, or may refrain from providing the service entirely. However, implementations described herein can be leveraged (e.g., by cloud platforms, etc.) to enable users to effectively and efficiently develop their own cloud architectures. In such fashion, implementations described herein can substantially improve the functioning of cloud computing systems and cloud platforms leveraged to implement such systems.

With reference now to the Figures, example embodiments of the present disclosure will be discussed in further detail.

FIG. 1 depicts an overview block diagram of a computing system for agentically-orchestrated foundational models for cloud architecture development according to some implementations of the present disclosure. In particular, a computing system 100 can include processor device(s) 102 and memory 104. In some implementations, the computing system 100 may be a computing system that includes multiple computing devices. Alternatively, in some implementations, the computing system 10 may be a distributed network of computing resources. Similarly, the processor device(s) 102 may include any computing or electronic device capable of executing software instructions to implement the functionality described herein. The memory 104 can be or otherwise include any device(s) capable of storing data, including, but not limited to, volatile memory (random access memory, etc.), non-volatile memory, storage device(s) (e.g., hard drive(s), solid state drive(s), etc.).

The memory 104 can include a user interaction module 106. The user interaction module 106 can receive information to a user computing device 108. For example, the user interaction module 106 can generate questionnaire information 110 that describes a cloud architecture questionnaire which includes architecture queries related to requirements of the cloud architecture that the user desires. In response, the user interaction module can receive user response information 111 from the user computing device. The user response information 111 can include user responses to the queries, and can indicate certain cloud architecture requirements for the proposed cloud architecture to fulfill.

In some implementations, the user response information 111 can be, or otherwise include, an image, diagram, etc. depicting a cloud architecture and/or generic component placeholders to be included within a proposed cloud architecture. For example, the user response information 111 can be an image depicting a visual representation of an architecture, such as a drawing or sketch produced by a user, that depicts at least some of the generic component placeholders. In this manner, the input can be modified to produce a refined visual representation rather than generating a visual representation de novo. Additionally, the capability to process visual representations of a cloud architecture enables models, such as agentic orchestration models, to iteratively refine the outputs of previous models. In this manner, agentic orchestration models prompted to perform different tasks can iteratively contribute to a visual representation of a cloud architecture to add additional detail and/or validate previous additions from prior models.

Additionally, or alternatively, in some implementations, the user response information 111 can include information provided by the user in some other format. For example, the user response information 111 may include information descriptive of selection of certain interface elements by the user, textual content provided by the user, historical information descriptive of prior interactions from the user, etc.

The memory 104 can include an agentic orchestration module 112. The agentic orchestration module 112 can instantiate, de-instantiate, train, optimize, utilize, and otherwise manage agentic orchestration models 114A-114N (generally, agentic orchestration models 114). As described previously, the agentic orchestration models 114 can be or otherwise include Large Foundational Models (LFMs). As described herein, a LFM refers to a machine-learned model that has been trained on large corpuses of training data, including training data associated with subject matter experts in cloud system architectures. For example, the agentic orchestration models 114 may be large language models trained to generate textual content. For another example, the agentic orchestration models 114 can be multimodal LFMs trained to generate textual content, images, audio, program-specific information (e.g., machine-readable code, machine-readable markup language, etc.), etc.

The agentic orchestration module 112 can include a prompt generator 116 and a prompt repository 118. The prompt generator 116 can generate prompts for the prompt repository. The prompts stored to the prompt repository can be utilized to prompt the agentic orchestration models 114, or instances thereof, to fulfill certain cloud architecture development roles (i.e., "cloud architecting" roles). Cloud architecting roles can include any type or manner of role typically assigned to an agent, such as an employee, for the purposes of cloud architecture development. Examples of cloud architecting roles include cloud architects, algorithm developers, software engineers, cloud designers, visual designers or artists, back-end developers, developer operations specialists, etc.

It should be noted that, although the agentic orchestration models 114 are depicted as being separate models, the agentic orchestration models 114 are not necessarily discrete and independent models. For example, the agentic orchestration models 114 can be instances of the same LFM that are prompted to perform different cloud architecting roles. Alternatively, the agentic orchestration models 114 can be different LFMs (or instances thereof) that are trained, fine-tuned, or otherwise optimized to fulfill a particular cloud architecting role.

In some implementations, the prompt generator 116 may pre-populate the prompt repository 118 with prompts for known roles. Additionally, or alternatively, the prompt generator 116 can generate a prompt based on the type of task specified by the user response information 111. Specifically, in some implementations, the user response information 111 can specify a type of task for the agentic orchestration module to complete, and the prompts provided to the agentic orchestration models 114 can be selected based on the specified task. For example, if the user response information 111 indicates a visual representation task, the prompt generator 116 can generate a cloud design or artist prompt for one of the agentic orchestration models 114. For another example, if the user response information 111 indicates a text generation task (e.g., for a written summary or overview of the proposed cloud architecture), the prompt generator 116 can generate a cloud technical writer or support specialist prompt for one of the agentic orchestration models 114.

In some implementations, the agentic orchestration module 112 can leverage the agentic orchestration models 114 to generate generic component placeholder information 120. The generic component placeholder information 120 can describe proposed generic component placeholders for components necessary to meet the cloud architecture requirements described by the user response information. In other words, the generic component placeholder information 120 can describe "types" of components that will be needed to implement the proposed cloud architecture.

As described herein, a "component" generally refers to a collection of hardware and/or software resources that collectively provide a function or service. For example, assume that a particular type of database is selected for a generic database placeholder. The selected database may be utilized by instantiating that particular type of database using cloud platform resources. Alternatively, the selected database may be utilized by partnering with a database service provider that instantiates and maintains that particular type of database using third-party resources. As such, the existence of a proposed generic component placeholder does not necessarily imply selection of a component to be implemented using cloud resources.

Examples of proposed generic component placeholders can include a "database" placeholder, a "firewall" placeholder, etc. Cloud components (e.g., a specific database service offering, a specific firewall service offering, etc.) can later be selected to fulfill the proposed generic component placeholders. In such fashion, the agentic orchestration module 112 can leverage the prompt repository 118 and the agentic orchestration models 114 to identify the types of components necessary to implement the proposed cloud architecture while meeting the cloud architecture requirements specified in the user response information 111.

As described previously, in some implementations, the user response information 111 can be, or otherwise include, an image, diagram, etc. depicting a cloud architecture and/or generic component placeholders to be included within a proposed cloud architecture. The agentic orchestration models 114 can be used to process the visual representation to refine the visual representation. For example, assume that the agentic orchestration module 112 processes the user response information 111 with one of the agentic orchestration models 114 prompted to fulfill a database engineering role to obtain a visual representation that depicts a generic database component placeholder. The agentic orchestration module 112 can process the visual representation with one of the agentic orchestration models 114 prompted to fulfill a storage engineering role to obtain a modified visual representation that depicts the generic database component placeholder and the generic storage component placeholder. The agentic orchestration module 112 can process the modified visual representation with another of the agentic orchestration models 114 prompted to fulfill a network engineering role to modify the visual representation such that the visual representation depicts a proposed interaction between the generic database component placeholder and a generic storage component placeholder.

Additionally, in some implementations, the agentic orchestration module 112 can leverage the agentic orchestration models 114 to generate a visual representation 122 of the generic component placeholder information 120. The visual representation 122 can be a diagram of the proposed cloud architecture that depicts the proposed generic component placeholders. For example, the agentic orchestration module 112 can select a prompt from the prompt repository 118 to prompt one of the agentic orchestration models 114 to fulfill a visual design or artist role. Additionally, the visual representation 122 can depict proposed interactions between the generic component placeholders. For example, a proposed interaction may exist between a generic database component placeholder and a generic storage component placeholder (e.g., for storing database backups). The agentic orchestration module 112 can select a prompt from the prompt repository 118 to prompt one of the agentic orchestration models 114 to fulfill a networking role.

The agentic orchestration module 112 can leverage the agentic orchestration models 114 to generate component selection information 124. The component selection information 124 can describe components selected for the placeholders indicated by the generic component placeholder information 120. For example, if the generic component placeholder information 120 includes a generic database placeholder, the component selection information 124 can describe a particular database technology (e.g., a relational database, a non-relational database, etc.) and/or a specific type of database (e.g., Structured Query Language (SQL), mySQL, PostgreSQL, etc.). The component selection information 124 can be generated by prompting one (or more) of the agentic orchestration models 114 with a prompt from the prompt repository 118 that instructs the model to fulfill a database-related role, such as a database engineer role. In some implementations, the component selection information 124 selects a set of cloud services from a plurality of candidate cloud services.

Additionally, in some implementations, the agentic orchestration module 112 can leverage the agentic orchestration models 114 to generate control configuration information 126. The control configuration information 126 can describe controls selected for the selected components indicated by the component selection information 124. As described herein, a security "control" refers to measure(s), mechanism(s), policy(s), etc. implemented to protect digital assets, information, systems, and networks from security threats and vulnerabilities. Security controls work to mitigate risks, deter potential attackers, detect security incidents, and respond effectively to security breaches. Security controls can take various forms, including technical controls such as firewalls, encryption, intrusion detection systems, and access controls, as well as procedural controls like security policies, user training, incident response plans, compliance frameworks, etc.

For example, assume that the component selection information 124 selects a particular type of database for a corresponding generic database placeholder described by the generic component placeholder information 120. The control configuration information 126 can describe one or more controls selected for the particular type of database. For example, the control configuration information 126 may describe a particular access policy for the database, a particular malicious actor detection technology to utilize in conjunction with the database, a mitigation strategy for a known vulnerability associated with the database, etc. The control configuration information 126 can be generated by prompting one (or more) of the agentic orchestration models 114 with a prompt from the prompt repository 118 that instructs the model to fulfill a security-related role, such as a cybersecurity engineer role, a developer operations specialist role, etc.

In some implementations, the memory 104 can include a cloud platform module 128. The cloud platform module 128 can deploy the components and controls indicated by the component selection information 124 and the control configuration information 126, respectively. For example, assume that the computing system 100 is associated with a cloud platform provider. As described previously, a cloud platform provider can generally refer to an entity that provides access to distributed networks of computing resources to implement various cloud services. As such, by deploying the components and controls indicated by the component selection information 124 and the control configuration information 126, the cloud platform module 128 can deploy a cloud service (and corresponding architecture) for the user computing device 108.

Figure 2:
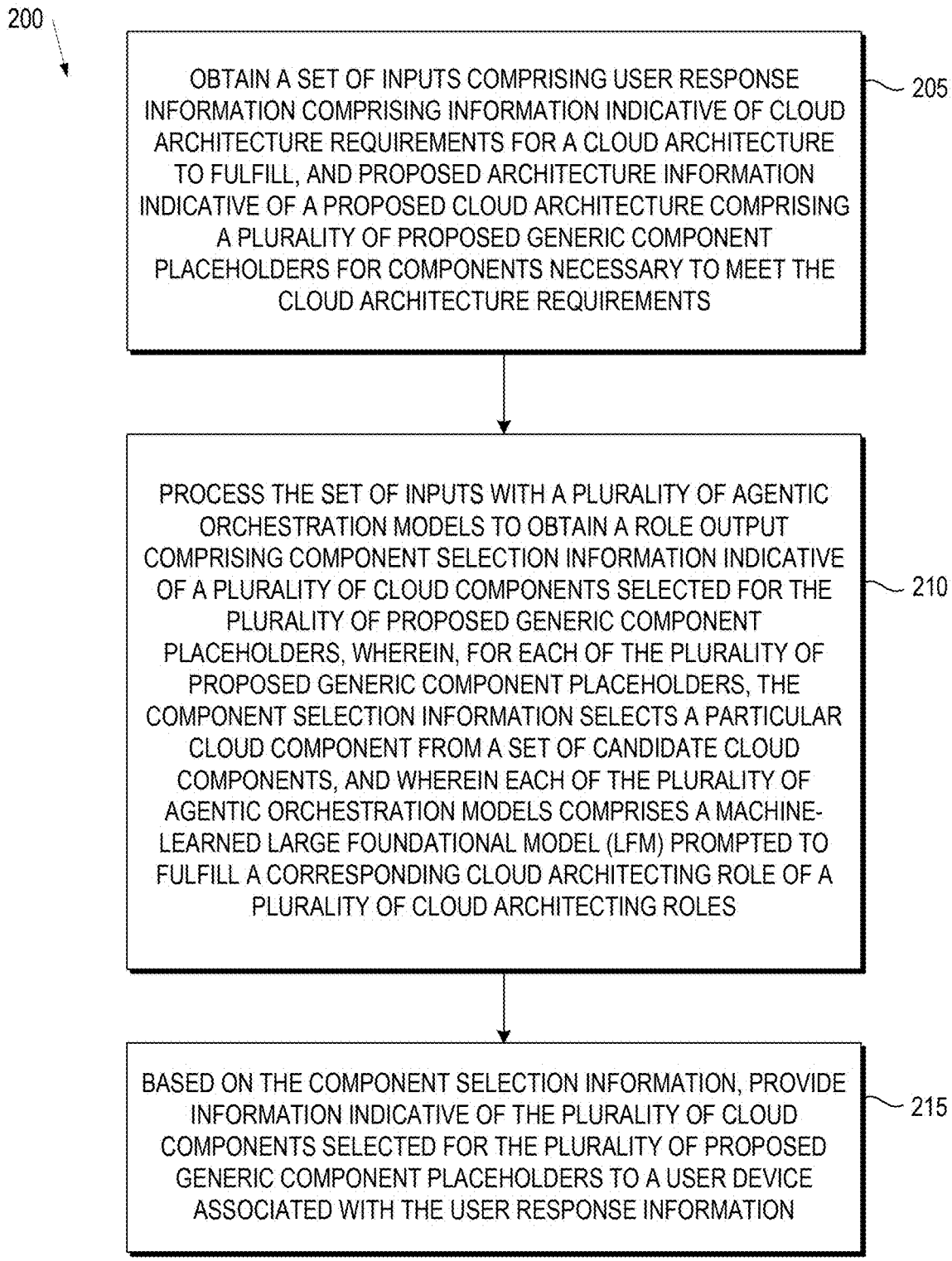
FIG. 2 is a flow diagram of an example method for leveraging agentic orchestration models to select cloud components for generic cloud component placeholders while fulfilling certain cloud architecture requirements, in accordance with some implementations of the present disclosure.

FIG. 2 is a flow diagram of an example method 200 for leveraging agentic orchestration models to select cloud components for generic cloud component placeholders while fulfilling certain cloud architecture requirements, in accordance with some implementations of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 200 is performed by the computing system 100 of FIG. 1. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 205, processing logic can obtain a set of inputs. The set of inputs can include user response information comprising information indicative of cloud architecture requirements for a cloud architecture to fulfill. The set of inputs can also include proposed architecture information indicative of a proposed cloud architecture. The proposed cloud architecture can include proposed generic component placeholders for components necessary to meet the cloud architecture requirements. As described herein, cloud architecture requirements generally refer to some functionality that a proposed cloud architecture must provide, some standard or regulation that a cloud architecture must fulfill, a certain type of component or security control that a cloud architecture must include, etc. For example, the cloud architecture requirements can specify that the proposed cloud architecture must include a database capable of performing 100 interactions per second. For another example, the cloud architecture requirements can specify that the storage component for the cloud architecture complies with European Union privacy regulations. For another example, the cloud architecture requirements can exclude certain software or hardware resources known to possess security vulnerabilities or likely to be insufficiently secure (e.g., certain CPUs with known vulnerabilities, a kernel driver with known vulnerabilities, unverified software packages, etc.). For yet another example, the cloud architecture requirements can require certain communication standards (e.g., end-to-end encryption for communications, obfuscation of user credentials, etc.).

At operation 210, the processing logic can process the set of inputs with agentic orchestration models to obtain a role output that includes component selection information indicative of cloud components selected for the proposed generic component placeholders. For each of the proposed generic component placeholders, the component selection information can select a particular cloud component from a set of candidate cloud components. For example, assume that one of the proposed generic component placeholders is for a generic "database" placeholder component. The set of candidate cloud components can include various types of databases (e.g., a MySQL database, a PostgreSQL database, etc.), and the component selection information can select one of the candidate cloud components for the generic database placeholder component.

Each of the agentic orchestration models can be, or include, a machine-learned LFM prompted to fulfill a corresponding cloud architecting role of a set of cloud architecting roles. To follow the previous example, the component selection information (or portion thereof) that selects the generic database component can be generated using an agentic orchestration model prompted to fulfill a database engineering role. The component selection information may then be verified by another agentic orchestration model fulfilling a cybersecurity engineering role (e.g., based on whether the cloud architecture requirements include a security requirement, etc.).

In some implementations, the user response information can be descriptive of responses from a user to a cloud service questionnaire. For example, a user can be provided with a questionnaire that includes multiple queries to the user regarding the cloud architecture to be proposed. The particular cloud architecture requirements can be described by, or otherwise inferred from, the user response information. In some implementations, the processing logic can provide a visual representation of the component selection information to a user computing device associated with the user. For example, assume that a visual representation of the proposed generic component placeholders that depicts the placeholders as objects (e.g., boxes, etc.) is provided to a requesting user. An updated visual representation can be subsequently provided to the user that depicts the selected cloud components and their associations with the proposed generic component placeholders (e.g., placing a depiction of a selected cloud component "inside" a box representing a corresponding generic component placeholder, etc.).

In some implementations, the processing logic can process the set of inputs with one of the agentic orchestration models to obtain a role output that includes a particular portion of the component selection information. The particular portion of the component selection information can indicate some portion of the plurality of cloud components selected for the plurality of proposed generic component placeholders. The processing logic can process the set of inputs with another agentic orchestration model to obtain another role output that includes a different portion of the component selection information. For example, assume that a database portion of the component selection information selects a database component while a firewall portion of the component selection information selects a firewall component. The database portion of the component selection information can be generated by processing the set of inputs with an agentic orchestration model prompted to fulfill a database engineering role, while the firewall portion of the component selection information can be generated by processing the set of inputs (and, in some implementations, the database portion of the component selection information) with an agentic orchestration model prompted to fulfill a cybersecurity role.

In some implementations, obtaining the set of inputs can further include obtaining task selection information. The task selection information can indicate a particular task selected from a set of candidate tasks. In some implementations, the task selection information can indicate a component selection task to select optimal components for the proposed generic component placeholders that meet the cloud architecture requirements. For example, the task selection information can indicate a type of component selection task to generate component selection information including textual content that describes the selected components. For another example, the task selection information can indicate another type of component selection task to generate component selection information including configuration information that, when processed, can cause deployment of the selected cloud components (e.g., a YAML file, a query language, a human-readable data format, a machine-readable configuration file, etc.).

Alternatively, the task selection information can indicate a component selection task to select optimal subsets of components for generic component placeholders that meet the cloud architecture requirements. For example, assume that both a SQL database component and a MySQL database component fulfill the cloud architecture requirements. The component selection information may indicate both the SQL and MySQL database components so that the user can make the final selection between the two components.

Additionally, or alternatively, in some implementations, the task selection information can indicate a component evaluation task that evaluates the selected components, and/or the component selection information, for code and/or security violations. Additionally, or alternatively, in some implementations, the task selection information can indicate multiple tasks to be performed. To follow the previous example, the task selection information can include instructions to perform the first task to generate the component selection information, and then to perform the second task to evaluate the previously generated component selection information. In such fashion, the task selection information can describe a series and/or order of tasks to be performed using the agentic orchestration models.

In some implementations, the agentic orchestration models (or the prompts provided to the models) can be selected based on the task selection information. For example, if the task selection information specifies a security verification task, a prompt can be selected for the agentic orchestration models that prompts a model to fulfill a cybersecurity role. For another example, if the task selection information specifies a component selection task, a prompt can be selected for the agentic orchestration models that prompts a model to fulfill a cloud engineering role.

At 215, the processing logic can, based on the component selection information, generate configuration information indicative of the cloud components selected for the proposed generic component placeholders. In some implementations, the processing logic can use the configuration information to deploy the cloud components. The configuration information can be or include software instructions that, when executed, cause deployment of the cloud components elected for the proposed generic component placeholders. For example, if a particular type of database software is selected as the database component for a proposed generic database placeholder, the configuration information can include a script to instantiate an instance of the particular database software using computing resources of the cloud platform.

Additionally, or alternatively, in some implementations, the processing logic can cause deployment of the cloud architecture based on the configuration information. To follow the previous example, assume that a third-party database service is selected as the database component for the proposed generic database placeholder. The processing logic can cause deployment of the cloud architecture by instructing the third-party provider of the database service to instantiate an instance of the third-party database service for the cloud architecture. Additionally, in some implementations, the processing logic can perform local configuration operations to enable communication with the third-party database service. For example, based on the configuration information, the processing logic can configure ports, APIs, firewall configurations, storage components, etc. to handle exchanges of information with the third-party database service.

In some implementations, the proposed architecture information is further indicative of a plurality of proposed interactions between the proposed generic component placeholders. As described herein, a "proposed interaction" can refer to proposed communications between the components selected to fulfill the generic component placeholders (e.g., a generic database component placeholder, a generic security component placeholder, a generic virtualization component placeholder, etc.).

For example, if the generic component placeholders include a generic storage component placeholder and a generic logging component placeholder (e.g., to generate interaction logs), the proposed interactions will likely include a proposed interaction between the generic logging component and the generic storage component because a logging component is likely to communicate logs to a storage component for long-term storage. Conversely, if one of the generic component placeholders is a generic interface firewall component placeholder, it is less likely that the proposed interactions include a proposed interaction between the generic interface firewall component placeholder and the generic logging component placeholder.

In some implementations, the processing logic can configure the cloud components for interactions in accordance with the proposed interactions described by the proposed architecture information. For example, the proposed architecture information can indicate an interaction between two different cloud components. The processing logic can configure the first cloud component and the second cloud component to communicate with each other in some manner (e.g., by configuring both to communicate via the same port, via an API, etc.). In some implementations, the processing logic can configure the components to restrict the two components from communicating with other components.

Figure 3:
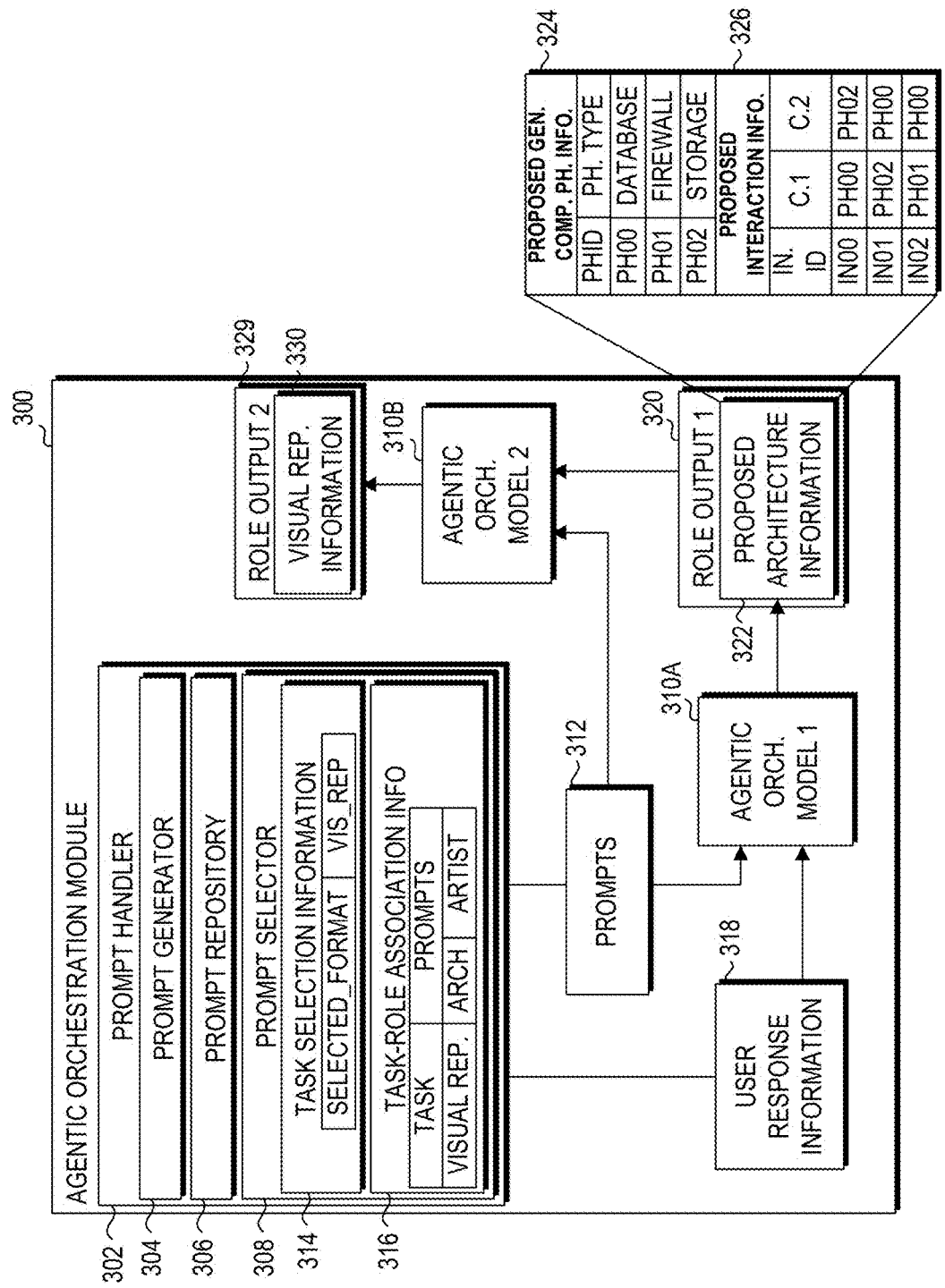
FIG. 3 is a block diagram for an agentic orchestration module for identifying generic cloud component placeholders that meet cloud architecture requirements for a proposed cloud architecture according to some implementations of the present disclosure.

FIG. 3 is a block diagram for an agentic orchestration module for identifying generic cloud component placeholders that meet cloud architecture requirements for a proposed cloud architecture according to some implementations of the present disclosure. In particular, an agentic orchestration module 300 can be a module implemented by a computing system to implement agentic orchestration of machine-learned models, such as the agentic orchestration module 112 of FIG. 1. The agentic orchestration module 300 can include a prompt handler 302. The prompt handler 302 can include a prompt generator 304 and a prompt repository 306 as described with regards to the prompt generator 116 and prompt repository 118 of FIG. 1.

The prompt handler 302 can include a prompt selector 308. The prompt selector 308 can select prompts to prompt agentic orchestration models 310A-310B (generally, agentic orchestration models 310). As described previously, "agentically orchestrated" models generally refer to machine-learned model instances that fulfill certain cloud architecture development roles typically performed by agents of a cloud service provider or cloud platform (e.g., engineer, designer, artist, security specialist, developer operations specialist, etc.). To "fulfill" a particular role, the model can generate textual content (or other inputs) from the perspective of an agent that fulfills that particular role. For example, if prompted to fulfill a cloud engineering role, the model can generate textual content from the perspective of a cloud engineer. In other words, the model can emulate a "typical" agent that fulfills that particular role when generating content.

In some implementations, an agentic orchestration model can be prompted to fulfill a particular role with a prompt that describes the particular role. For example, an agentic orchestration model can be prompted with textual content describing the particular role (e.g., responsibilities, years of experience, common types of team members, degree of expertise in certain fields, etc.). It should be noted that, although the agentic orchestration models 310 are depicted as fulfilling particular roles in response to receiving prompts, other techniques can also be utilized to cause the agentic orchestration models 310 to fulfill the particular roles. For example, an agentic orchestration model can be optimized to fulfill a role via a training or fine-tuning process that adjusts weights of the model's parameters.

The prompt selector 308 can select prompts 312 for the agentic orchestration models 310. In some implementations, the prompt selector 308 can select the prompts 312 based on task selection information 314. The task selection information 314 can be information indicative of a particular task for the agentic orchestration module 300 to perform. For example, assume that the agentic orchestration module 300 can perform a variety of different tasks, such as identifying generic component placeholders, selecting components for generic component placeholders, generating a visual diagram of a proposed cloud architecture, generating a textual summary of the architecture, performing a comparative analysis between a proposed cloud architecture and a different cloud architecture, etc. The task selection information 314 can indicate one (or more) of the tasks for the agentic orchestration module 300 to perform. Additionally, or alternatively, in some implementations, the task selection information 314 can indicate a particular format for an output requested from the agentic orchestration module. For example, the task selection information can indicate a visual diagram task and a particular format for the visual diagram.

In some implementations, the prompt selector 308 can include task-role association information 316. The task-role association information 316 can describe the roles of agents that can collectively perform a particular task. Based on the task-role association information 316, the prompt selector 308 can select the prompts 312 to provide to the agentic orchestration models. Additionally, or alternatively, in some implementations, the agentic orchestration module 300 can select agentic orchestration models already optimized to fulfill the roles indicated by the task-role association information 316.

To follow the depicted example, the task selection information 314 can indicate a visual representation task. The task-role association information 316 can indicate that a solutions architect role and an artist role are required to fulfill the visual representation task. In response, the prompt selector 308 can select the prompts 312 to prompt the agentic orchestration model 310A to perform a cloud architecture design role and prompt the agentic orchestration model 310B to perform a visual artist role.

In some implementations, the task-role association information 316 can describe an order in which the agentic orchestration models 310 are to be utilized. More specifically, when multiple agentic orchestration models are utilized, the models can successively process the outputs of preceding models as inputs to "conversationally" utilize the outputs of preceding models as context. For example, if an agentic orchestration model prompted to fulfill a cloud architecture design role generates a cloud architecture output, a subsequent agentic orchestration model prompted to fulfill an artist role can process the cloud architecture output to generate a visual representation of the cloud architecture output. As such, the task-role association information 316 can indicate an order in which the agentic orchestration models 310 are to be utilized. The task-role association information 316 can also indicate whether an agentic orchestration model is to take some other model's output as an input.

The agentic orchestration module 300 can include user response information 318. The user response information 318 can be descriptive of particular cloud architecture requirements to be fulfilled by the proposed cloud architecture. The user response information 318 can be received in response to a query (or multiple queries) provided to a user. For example, a user can be provided with a questionnaire that includes multiple queries to the user to describe various functions, capabilities, restrictions, service offerings, etc. for a particular cloud architecture the user wishes to create.

The particular cloud architecture requirements can be described by, or otherwise inferred from, the user response information 318. For example, the user response information 318 can be processed with a machine-learned model (e.g., the agentic orchestration model 310A, etc.) to identify the cloud architecture requirements. Alternatively, in some implementations, the user response information 318 can be obtained from a source other than a user. For example, the user response information 318 can be generated by an automated process.

The prompt selector 308 can select one of the prompts 312 for the agentic orchestration model 310A to process. In turn, processing one of the prompts 312 can cause the agentic orchestration model 310A to process successive (or concurrent) inputs while fulfilling a cloud architect role. In other words, the agentic orchestration model 310A can generate outputs from the perspective of a typical cloud architect in response to processing one of the prompts 312 that prompts the model to fulfill the cloud architect role. To follow the depicted example, the agentic orchestration module 300 can utilize the agentic orchestration model 310A to process the prompt 312 and the user response information 318 to obtain a role output 320. As described herein, a "role output" generally refers to a type of "output" or "work" typically produced by an agent in the role being fulfilled by the agentic orchestration model. For example, the role output for an agentic orchestration model fulfilling a network engineer role may be a configuration file specifying various networking parameters. For another example, the role output for an agentic orchestration model fulfilling an artist role may be a visual representation of a cloud architecture.

The role output 320 can be, or otherwise include, proposed architecture information 322. The proposed architecture information 322 can include proposed generic component placeholder information 324. The proposed generic component placeholder information 324 can describe generic component placeholders for particular "types" of components that are to be later selected. To follow the depicted example, the proposed generic component placeholder information 324 can describe a generic database component placeholder, a generic firewall component placeholder, and a generic storage component placeholder. Specific component offerings can be subsequently selected to fulfill, or replace, the generic component placeholders. For example, a MySQL database component can be selected from a set of candidate database components (e.g., PostgreSQL, MongoDB, etc.) to fulfill the generic database component placeholder. The proposed generic component placeholders described by the proposed generic component placeholder information 324 are visualized and described in greater detail with regards to FIG. 4.

Additionally, in some implementations, the proposed architecture information 322 can include proposed interaction information 326. The proposed interaction information 326 can indicate proposed interactions between the generic component placeholders of the generic component placeholder information 324. For example, assume that the generic component placeholder information 324 is indicative of a generic Application Programming Interface (API) component placeholder and some other generic component placeholder. The proposed interaction information 326 can indicate whether the other generic component placeholder is permitted to communicate with the API or if the generic component placeholder is restricted from communicating with the API.

In some implementations, the proposed interaction information 326 can describe configuration information for communicative configuration of cloud components selected to fulfill the proposed generic component placeholders. For example, assume that the proposed interaction information 326 describes an interaction between a generic database component and a generic storage component, and that components have been selected for the generic component placeholders. Based on the proposed interaction information 326, the selected database component and the selected storage component can be configured to communicate using the same interface (e.g., the same API, a certain port, a certain range of ports, a certain communication standard, etc.). Additionally, or alternatively, based on the proposed interaction information 326, the selected database component and the selected storage component can be provisioned with encryption keys or the like for encryption and decryption of exchanged information.

In some implementations, additional components can be configured to facilitate the proposed interaction between the selected components. For example, if the selected database component and the selected storage component are configured to exchange information via a particular port, a router or modem device can also be configured based on the proposed interaction information 326 to reserve that particular port for utilization by the selected database component and selected storage component. For another example, if the selected database component and the selected storage component are configured to exchange information via an API, the API can be configured based on the proposed interaction information 326 to format or otherwise modify information retrieved from the storage component so that the information is ingestible by the database component.

Additionally, or alternatively, in some implementations, the proposed interaction information 328 can describe communication characteristics for communications between the generic component placeholders (or the components to be selected for those placeholders). Examples of communication characteristics can include latency, bandwidth, communication frequency, necessary security protocols, necessary operations for regulatory compliance (e.g., deleting or obfuscating communications for privacy purposes, etc.), etc. For example, the proposed interaction information 328 can specify a bandwidth to be configured for communications between components selected for two of the generic component placeholders (e.g., a bandwidth of 10 Mbps for communications between a generic database placeholder and a generic storage placeholder). Additionally, or alternatively, in some implementations, the proposed interaction information 328 can specify minimum and/or maximum values for certain communication characteristics. To follow the previous example, the proposed interaction information 328 can specify a minimum bandwidth and a maximum bandwidth to be configured for communications between components selected for the two generic component placeholders.

In some implementations, a model can be prompted to fulfill multiple roles. For example, in low-complexity scenarios (e.g., a relatively small quantity of placeholders, etc.) a cloud architect agent can be capable of generating both the proposed generic component placeholder information 324 and the proposed interaction information 326. However, in higher complexity scenarios, a cloud architect agent may generate the proposed generic component placeholder information 324 while deferring to a network engineer agent to generate the proposed interaction information 326. The prompt selected for the agentic orchestration model 310A from the prompts 312 can instruct the agentic orchestration model 310A to fulfill the cloud architect role and then fulfill the network engineer role. For example, the prompt can instruct the agentic orchestration model 310A to process the user response information 318 to generate the proposed generic component placeholder information 324, and then instruct the agentic orchestration model 310A to process the user response information 318 and the proposed generic component placeholder information 324 to generate the proposed interaction information 326.

In some implementations, based on the task selection information 314, the prompt selector 308 can select an artist role prompt from the prompts 312 for the agentic orchestration model 310B to process. In turn, processing the artist role prompt selected from the prompts 312 can cause the agentic orchestration model 310B to process successive (or concurrent) inputs while fulfilling an artist or design role (e.g., an expert in creating visual representations of cloud architectures). Once prompted, the agentic orchestration module 300 can utilize the agentic orchestration model 310B to process the proposed architecture information 322 to obtain a role output 329. The role output 329 can include visual representation information 330.

In some implementations, the visual representation information 332 can include image(s) that depict a proposed cloud architecture that includes the proposed generic component placeholders and the proposed interactions. Alternatively, in some implementations, the visual representation information 332 can include software instructions (i.e., programmatic code, machine-readable code, etc.) that, when processed or executed, can produce an image or interactable representation of the proposed generic component placeholders and the proposed interactions.

Figure 4:
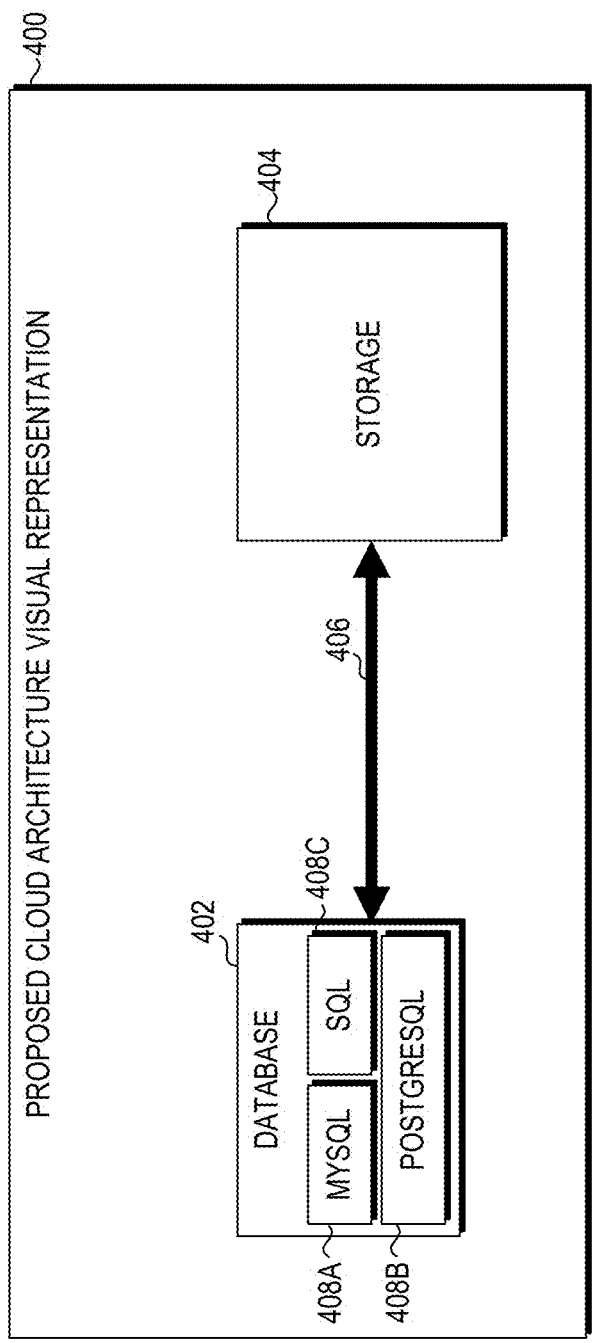
FIG. 4 illustrates an example visual representation of a proposed cloud architecture diagram with generic component placeholders according to some implementations of the present disclosure.

Turning to a more specific example, FIG. 4 illustrates an example visual representation of a proposed cloud architecture diagram with generic component placeholders according to some implementations of the present disclosure. As illustrated, visual representation 400 can be a visual representation (e.g., an image, a series of images, video data, renderable software instructions, etc.) that depicts a proposed cloud architecture diagram. Alternatively, the visual representation 400 can be a proposed cloud architecture diagram implemented or otherwise indicated by software instructions. The visual representation 400 can depict proposed generic component placeholders and corresponding proposed interactions that are determined as described with regards to FIG. 3.

The visual representation 400 can include generic component placeholder elements. A generic component placeholder element represents a generic component placeholder (e.g., as indicated by the proposed generic component placeholder information 324 of FIG. 3). The generic component placeholder elements can serve as visual indicators to the user that particular types of components are needed to create a cloud architecture that meets the cloud architecture requirements. The visual representation 400 can depict a generic database placeholder element 402 and a generic storage placeholder element 404. The generic database placeholder element 402 can represent a generic database component placeholder for a future database component to be selected for the proposed cloud architecture. More generally, the generic database placeholder element 402, as depicted, can indicate to a user that some type of "database" component is needed without indicating a particular type of database. Similarly, the generic storage placeholder element 404 can indicate that some type of "storage" component is needed without selecting a particular type of storage component.

In some implementations, the visual representation 400 can depict a proposed interaction element 406 indicating a proposed interaction between a component selected for the generic database placeholder element 402 and a component selected for the generic storage placeholder element 404. The proposed interaction element 406 indicated by the proposed interaction element 406 can refer to any type or manner of connection, exchange of information, communication, etc. For example, the proposed interaction element 406 may represent a socket connection. For another example, the proposed interaction element 406 may represent a regular exchange of information (e.g., storing a backup of a database, restoring a database from a stored backup, etc.).

Figure 5:
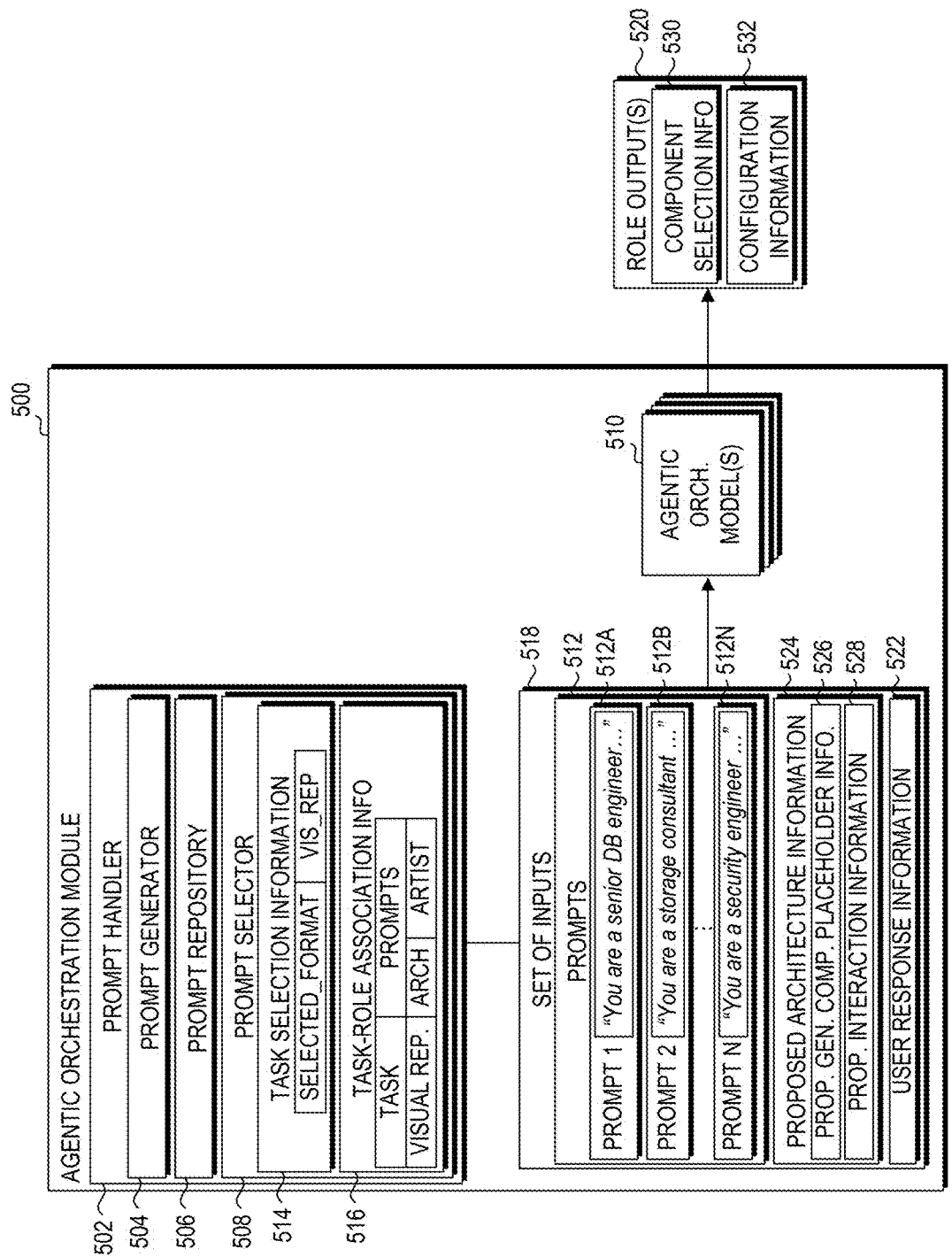
FIG. 5 is an overview block diagram for utilizing the agentic orchestration module to select cloud components for the generic cloud component placeholders that meet the cloud architecture requirements according to some implementations of the present disclosure.

FIG. 5 is an overview block diagram for utilizing the agentic orchestration module to select cloud components for the generic cloud component placeholders that meet the cloud architecture requirements according to some implementations of the present disclosure. FIG. 5 will be discussed in conjunction with FIG. 3. In particular, agentic orchestration module 500 can be a module implemented by a computing system to implement agentic orchestration of machine-learned models, as described with regards to the agentic orchestration module 300 of FIG. 3. Similarly, the agentic orchestration module 500 can include a prompt handler 502, prompt generator 504, prompt repository 506, prompt selector 508, one or more agentic orchestration model(s) 510, prompts 512, task selection information 514, task-role association information 516, etc. to implement functionality as described with regards to FIG. 3.

The agentic orchestration module 500 can be utilized to select cloud components for the generic cloud component placeholders that meet the cloud architecture requirements. For each of the proposed generic component placeholders, a cloud component can be selected to fulfill the placeholder from a set of candidate cloud components. For example, a set of candidate cloud components (e.g., MongoDB, MySQL, PostgreSQL, etc.) can exist for a proposed generic database placeholder. One of the candidate cloud components can be selected to fulfill the proposed generic database placeholder using the agentic orchestration module 500.

The agentic orchestration module 500 can include the same manner of task selection information 514 as the task selection information 314 of FIG. 3. However, unlike the task selection information 314, which described a visual representation task, the task selection information 514 can describe a component selection task. The component selection task can be a task to select cloud components from sets of candidate components for proposed generic component placeholders. For example, if a generic firewall component is proposed, performance of the component selection task can select a particular firewall cloud component from a set of candidate firewall cloud components. As described herein, "components" can refer to software packages, units of software instructions (e.g., functions, libraries, executables, etc.), hardware components, hardware resources, third-party component or service offerings, or any combination thereof.

Similarly, the agentic orchestration module 500 can include the same manner of task-role association information 516 as the task-role association information 316 of FIG. 3. However, unlike the task selection information 314, which describes roles sufficient to perform a visual representation task, the task selection information 514 can describe roles sufficient to perform a component selection task. In some implementations, the task-role association information 516 can be generated based on the generic cloud components proposed by the proposed architecture information (e.g., the proposed architecture information 322 of FIG. 3). For example, assume the proposed architecture information 322 describes a generic firewall component placeholder and a generic storage component placeholder. Based on the proposed architecture information 322, task-role association information 516 can be generated (e.g., using one of the agentic orchestration model(s) 510, etc.) that describes roles sufficient to complete the component selection task by selecting cloud components for the firewall and storage placeholders, such as a security engineer and a storage consultant, respectively.

Specifically, the agentic orchestration module can obtain a set of inputs 518. The set of inputs 518 can be processed by the one or more agentic orchestration model(s) 510 to obtain one or more corresponding role output(s) 520. The set of inputs can include the prompts 512A-512N (generally, prompts 512). In some implementations, the set of inputs can include user response information 522. The user response information 522 can describe user responses to queries related to desired cloud feature offerings and architecture requirements for a cloud architecture desired by a user. In some implementations, the user response information 522 can include the same information as the user response information 318 of FIG. 3.

Alternatively, in some implementations, the user response information 522 can include responses to queries provided to the user subsequently or concurrently with generation of the proposed architecture information 322 of FIG. 3. As described in FIG. 3, the user response information 318 can be obtained in response to a questionnaire regarding features and requirements for a cloud architecture desired by the user, and can be processed using the agentic orchestration models 310 to obtain the proposed architecture information 322. Based on the proposed architecture information 322, additional queries can be provided to the user to narrow the "search space" for candidate cloud components.

For example, if the proposed architecture information describes a proposed generic database placeholder, the additional queries can query the user regarding desired database functionality and requirements (e.g., "what type of data is being stored?", "how important is retrieval time?", "how important is accuracy?", etc.). Based on the user's responses to the additional queries, certain database components can be removed from the pool of candidate database components to select for the generic database placeholder (e.g., removing database components known to be low-speed if the user indicates that retrieval speed is important, etc.).

In some implementations, the additional queries provided to the user can be generated using one of the agentic orchestration model(s) 510. For example, one of the prompts 512 can be a prompt for a sales agent associated with a cloud platform provider that enables cloud service architectures. The prompt can be provided to one of the agentic orchestration model(s) 510 alongside the proposed architecture information 322 to obtain the additional queries to provide to the user. Alternatively, in some implementations, the additional queries can be provided by a human sales agent associated with a cloud platform provider or the like.

The set of inputs 518 can include proposed architecture information 524. In some implementations, the proposed architecture information 524 can include the same information as the proposed architecture information 322 of FIG. 3. For example, the proposed architecture information 524 can include proposed generic component placeholder information 526 and proposed interaction information 528. The proposed generic component placeholder information 526 can propose generic component placeholders that meet the cloud architecture requirements. The proposed interaction information 528 can describe proposed interactions between the components selected for the generic component placeholders as described with regards to FIG. 3.

The agentic orchestration model(s) 510 can process the set of inputs 518 to obtain the role output(s) 520. The role output(s) 520 can include component selection information 530. The component selection information 530 can describe components selected for the placeholders indicated by the generic component placeholder information 526. For example, if the generic component placeholder information 526 includes a generic database placeholder, the component selection information 530 can describe a selected database offering (e.g., a relational database, a non-relational database, etc.) and/or a selected type of database offering (e.g., Structured Query Language (SQL), mySQL, PostgreSQL, etc.) to fulfill the generic database placeholder.

In some implementations, multiple portions of the component selection information 530 can be generated using multiple corresponding agentic orchestration model(s) 510 and prompt(s) 512. For example, assume that the proposed generic component placeholder information 526 proposes a generic database component placeholder and a generic storage component placeholder. The prompt 512A can be provided to one of the agentic orchestration model(s) 510 to prompt the model to fulfill a senior database engineering role. The model can then process the proposed architecture information 524 to obtain a portion of the component selection information 530 that selects a database technology for the generic database component placeholder. The prompt 512B can then be provided to some other model (or the same model) from the agentic orchestration model(s) 510 to prompt the model to fulfill a storage consultant role. The model can then process the proposed architecture information 524 to obtain another portion of the component selection information 530 that selects a storage technology for the generic storage component placeholder.

In some implementations, the component selection information 530 can describe cloud components selected without a corresponding generic component placeholder proposed by the proposed architecture information 524. For example, assume that the proposed architecture information 524 proposes a generic database component placeholder but does not propose a generic high-speed memory placeholder. Further assume that a database technology is selected for the generic database component placeholder that is substantially optimized by the inclusion of a high-speed memory component. In this scenario, even though a generic high-speed memory placeholder is not proposed, a high-speed memory cloud component may still be selected to optimize the database technology selected for the placeholder. In other words, the agentic orchestration models, when fulfilling their roles as prompted using the prompts 512, can deviate from the proposed architecture information to select more optimal combinations of cloud components for the user, if necessary.

In some implementations, the role output(s) 520 can include configuration information 532. Additionally, or alternatively, in some implementations, the component selection information 530 can be or otherwise include the configuration information 532. The configuration information 532 can indicate the cloud components selected for the proposed generic component placeholders. Additionally, in some implementations, the configuration information 532 can be utilized to configure the selected cloud components described by the component selection information 530. As described herein, "configuration information" can generally refer to any type or manner of configuration file that can be utilized to deploy selected cloud components. For example, the configuration information 532 can be a structured data object or plaintext descriptive of values for parameters of a selected cloud component (e.g., an installation path for a component, a quantity of storage allocation for a database component, a degree of security to implement with a firewall component, etc.).

In some implementations, the configuration information 532 can be a script or the like that, when executed, causes deployment of a selected cloud component. For example, the configuration information 532 may be a script or data object (e.g., YAML, JSON, REGO, etc.) that, when executed, causes allocation of computing resources for a database software instance, causes database software to be installed, and/or causes an instance of the database software to be instantiated. For another example, the configuration information 532 may be a script that, when executed, causes a service instantiation request to be provided to a third-party database service provider. As such, it should be generally understood that the configuration information 532 can cause configuration and/or deployment of selected cloud components directly and/or indirectly through interactions with third-party services.

In particular, in some implementations, the agentic orchestration model(s) 510 can be leveraged to communicate with third-party service providers that provide selected cloud components as services. As an example, assume that a third-party storage service (e.g., a cloud storage service) is selected as a cloud component for a generic storage component placeholder. To generate (some of) the configuration information 532, one of the agentic orchestration model(s) 510 can be prompted with the prompt 512B to fulfill the storage consultant role. The prompt 512B can further instruct the model to interact with the third-party service provider to cause deployment of the third-party storage service. For example, the prompted agentic orchestration model 510 can generate a structured data request for deployment of the third-party storage service (e.g., as specified by the configuration information 532) via an API provided by the third-party service provider. For another example, the prompted agentic orchestration model 510 can converse with a customer support agent of the third-party service provider to deploy the service.

Figure 6:
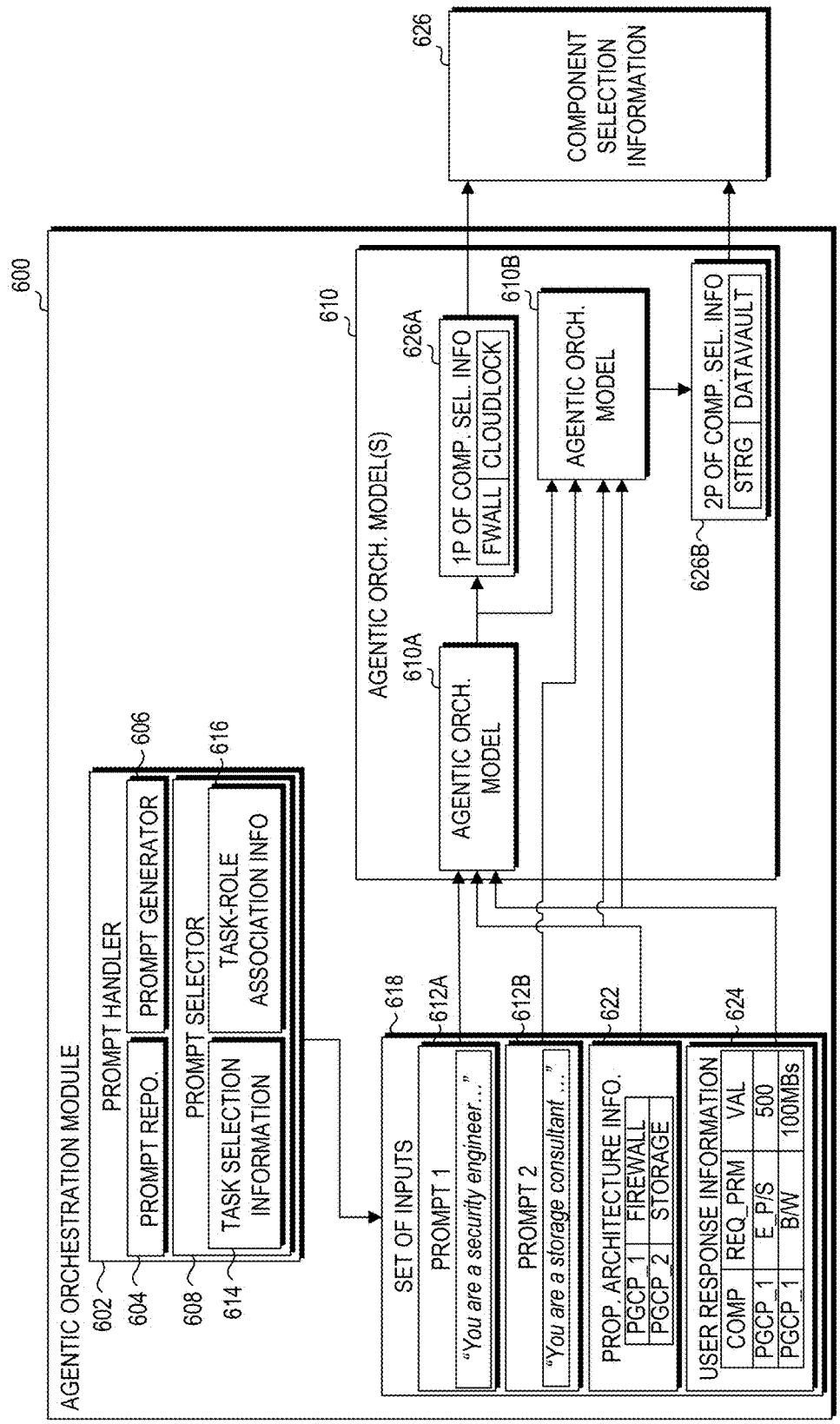
FIG. 6 is a detailed block diagram for utilizing the agentic orchestration module to generate component selection information and configuration information based on proposed cloud architecture information according to some implementations of the present disclosure.

FIG. 6 is a detailed block diagram for utilizing the agentic orchestration module to generate component selection information and configuration information based on proposed cloud architecture information according to some implementations of the present disclosure. FIG. 6 will be discussed in conjunction with FIGS. 3 and 5. In particular, as described with regards to FIG. 5, agentic orchestration module 600 can be a module implemented by a computing system to implement agentic orchestration of machine-learned models, as described with regards to the agentic orchestration module 500 of FIG. 5. Similarly, the agentic orchestration module 600 can include a prompt handler 602, prompt generator 604, prompt repository 606, prompt selector 608, one or more agentic orchestration model(s) 610, prompts 612, task selection information 614, task-role association information 616, a set of inputs 618, etc. to implement functionality as described with regards to FIG. 6.

In particular, the set of inputs 618 can include a prompt 612A. The prompt 612A can be a prompt (e.g., a portion of textual content, an embedding, a vector, etc.) that prompts agentic orchestration model 610A to fulfill a security engineer role. The set of inputs 618 can include a prompt 612B. The prompt 612B can be a prompt that prompts agentic orchestration model 610B to fulfill a storage consultant role.

The set of inputs 618 can include proposed architecture information 620 and user response information 624. The proposed architecture information 620 can propose generic component placeholders that meet cloud architecture requirements indicated by the user response information 624. To follow the depicted example, the proposed architecture information 622 can propose a generic firewall component (e.g., "PGCP_1: Firewall") and a generic storage component (e.g., "PGCP_2: Storage"). The user response information 624 can indicate cloud architecture requirements to be fulfilled by the components selected for the generic placeholders. To follow the depicted example, the user response information 624 can indicate that an information exchange rate of 500 exchanges per second (e.g., "E_P/S: 500) is required for the database component (e.g., PGCP_1). The user response information 624 can further indicate a required bandwidth of 100 Megabytes per second (e.g., "B/W: 100 MBs") for the database component (e.g., PGCP_1).

Once prompted, the agentic orchestration model 610A can process the proposed architecture information 622 and the user response information 624 to obtain a portion of component selection information 626A. Because the agentic orchestration model 610A is prompted to fulfill the security engineer role, the portion of component selection information 626A can select a cloud component from a set of candidate cloud components for the firewall component for the generic firewall placeholder indicated by the proposed architecture information 622. Specifically, the agentic orchestration model 610A can generate the portion of component selection information 626A to select a cloud component from the set of candidate cloud components based on the cloud architecture requirements indicated by the user response information 624.

To follow the depicted example, the user response information 624 only includes cloud architecture requirements for the generic database placeholder component. As such, the agentic orchestration model 610A can evaluate standard or predetermined metrics to select the firewall cloud component (e.g., cost, scalability, ease of maintenance, resource requirements, security standard compatibility, etc.). For example, assume that the set of inputs 618 includes contextual information (not illustrated) associated with a prior cloud architecture implemented by the user who provided the user response information 624. The prior cloud architecture described by the context information can include a prior firewall cloud component. Based on the context information, the agentic orchestration model 610A can select a firewall most similar to the prior firewall cloud component to reduce the work necessary to move to a new cloud architecture. Alternatively, if the context information is indicative of inefficiencies caused by the prior firewall cloud component (e.g., error log information, user feedback information, etc.), the agentic orchestration model 610A can select a firewall that is dissimilar to the prior firewall cloud component to minimize the occurrence of future inefficiencies.

As described previously, the set of inputs 618 can include a prompt 612B that prompts agentic orchestration model 610B to fulfill a storage consultant role. The agentic orchestration model 610B can process the prompt 612B along with the proposed architecture information 622 and the user response information 624 to generate a second portion of component selection information 626B. Additionally, in some implementations, the agentic orchestration model 610B can process the portion of component selection information 626A to generate the portion of component selection information 626B.

For example, the portion of component selection information 626A can indicate selection of a "CLOUDLOCK" firewall cloud component for the generic firewall component placeholder. However, the "CLOUDLOCK" firewall cloud component may only be compatible with certain storage components. As such, by processing the portion of component selection information 626A, the agentic orchestration model 610B can ensure that the portion of component selection information 626B indicates a storage component (e.g., "DATAVAULT") that is compatible with the selected firewall component.

It should be noted that similar functionality can be performed by the agentic orchestration model 610A to generate and/or refine the portion of component selection information 626A. To follow the previous example, assume that the "CLOUDLOCK" firewall component is compatible with the "DATAVAULT" storage component. Further assume that some other firewall cloud component from the set of candidate components is also compatible with the "DATAVAULT" storage component, but exhibits superior performance in combination with the "DATAVAULT" storage component in comparison to the "CLOUDLOCK" firewall component. The agentic orchestration model 610A can process the portion of component selection information 626A and the portion of component selection information 626B to modify the portion of component selection information 626A or to generate a refined portion of component selection information (not illustrated). The refined or new portion of component selection information can include the other firewall cloud component that exhibits superior performance. The portions of component selection information 626A and 626B can be combined and provided as component selection information 626 to the user. In this manner, the agentic orchestration models 610A can select a combination of cloud components to provide optimal performance while meeting the cloud architecture requirements.

Figure 7:
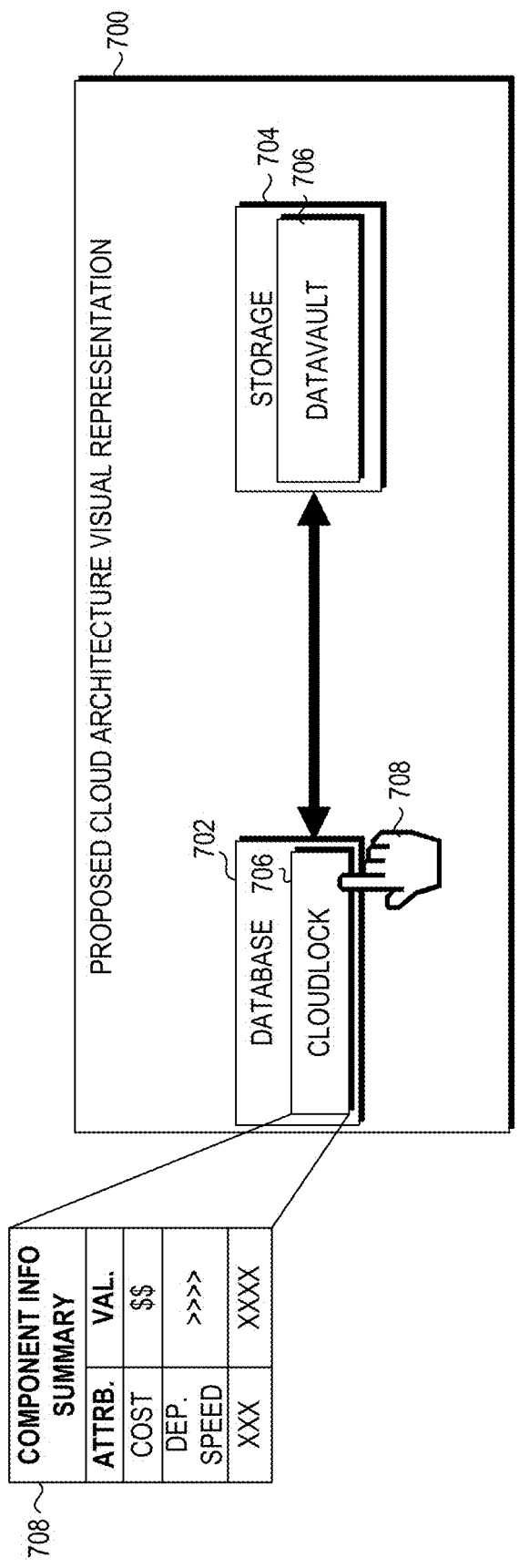
FIG. 7 illustrates an example visual representation of a proposed cloud architecture diagram with cloud components selected for generic component placeholders according to some implementations of the present disclosure.

FIG. 7 illustrates an example visual representation of a proposed cloud architecture diagram with cloud components selected for generic component placeholders according to some implementations of the present disclosure. As illustrated, visual representation 700 can be a visual representation (e.g., an image, a series of images, video data, renderable software instructions, etc.) that depicts a proposed cloud architecture diagram. Alternatively, the visual representation 400 can be a proposed cloud architecture diagram implemented by (or renderable from) software instructions. The visual representation 700 can depict proposed generic component placeholders and corresponding proposed interactions that are determined as described with regards to FIG. 6.

The visual representation 700 can include generic component placeholder elements (e.g., elements 702 and 704). As described with regards to FIG. 4, the generic component placeholder elements can identify proposed generic component placeholders. The generic component placeholder elements can serve as visual indicators to the user that particular types of components are needed to create a cloud architecture that meets the cloud architecture requirements. The generic component placeholder elements can include selected cloud component elements (e.g., 706 and 708). The selected cloud component elements can serve as visual indicators to the user that particular cloud components have been selected to fulfill the generic component placeholders indicated by the generic component placeholder elements.

To follow the depicted example, the visual representation 700 can include a generic database firewall element 702 and a generic storage placeholder element 704. A selected cloud component element 706 can be depicted within the generic database firewall element 702 to indicate that the selected cloud component element 706 has been selected to fulfill the generic database firewall element 702. Specifically, the selected cloud component element 706 can indicate that a "CLOUDLOCK" cloud component has been selected for the generic database component. Similarly, selected cloud component element 706 can be depicted within the generic database storage element 704 to indicate that the selected cloud component element 706 (e.g., "DATAVAULT") has been selected to fulfill the generic database storage element 704.

In some implementations, the selected cloud component element 706 can be selectable by a user. For example, assume that the visual representation 700 is provided for display at a user device. The user can provide an input via a user input device to move a cursor 708 to select the selected cloud component element 706. The selected cloud component element 706 can include a supplemental information element 710 that can be configured to be displayed upon selection of the selected cloud component element 706. The supplemental information element 710 can include supplemental information descriptive of the selected cloud component. In this manner, the user can independently evaluate the merits of the cloud component indicated by the selected cloud component element 706.

Figure 8A:
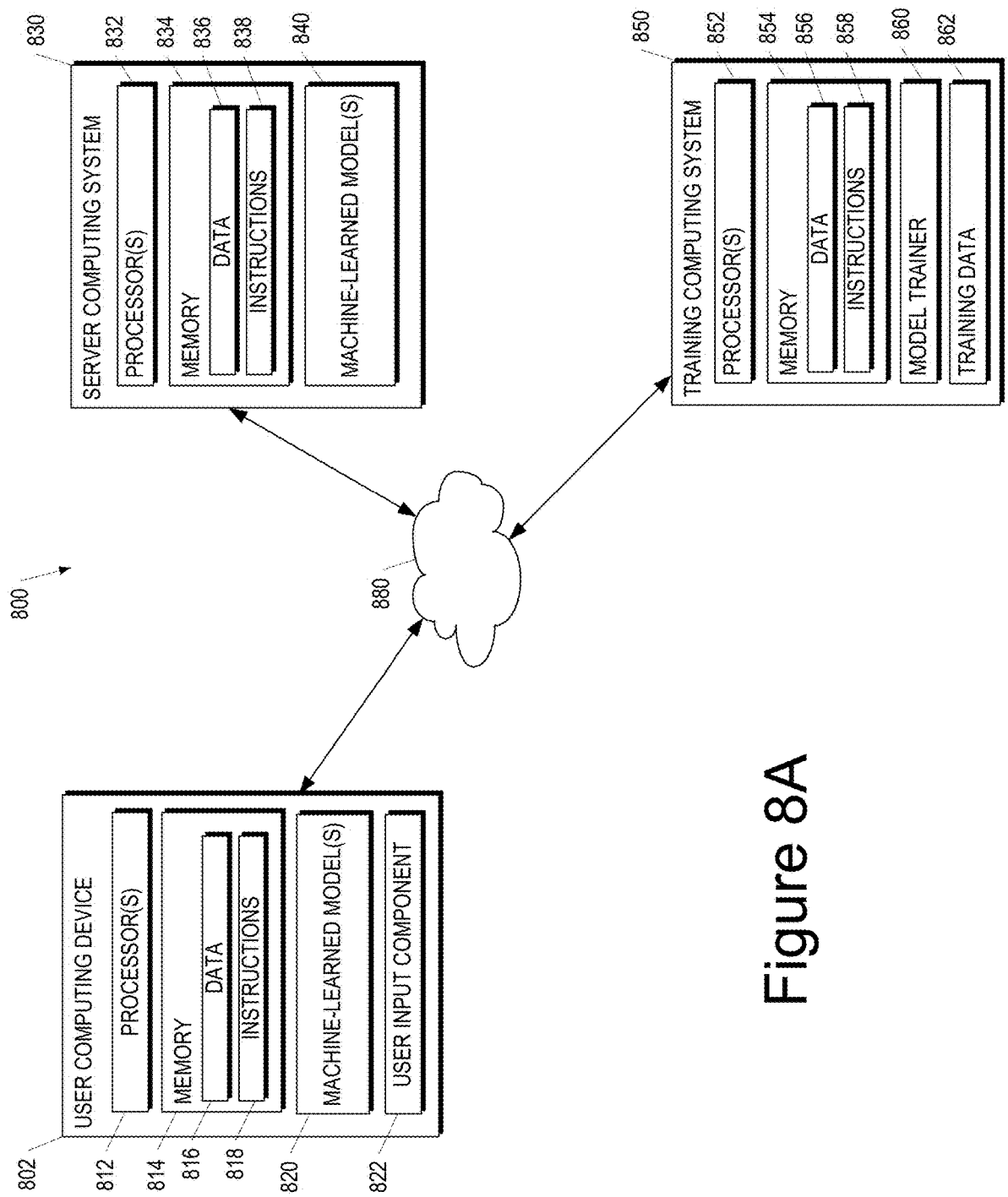
FIG. 8A depicts a block diagram of an example computing system that performs agentic orchestration according to some implementations of the present disclosure.

FIG. 8A depicts a block diagram of an example computing system 800 that performs agentic orchestration according to some implementations of the present disclosure. The system 800 includes a user computing device 802, a server computing system 830, and a training computing system 850 that are communicatively coupled over a network 880.

The user computing device 802 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 802 includes one or more processors 812 and a memory 814. The one or more processors 812 can be any suitable processing device (e.g., a processor core, a microprocessor, an ASIC, an FPGA, a controller, a microcontroller, etc.) and can be one processor or a plurality of processors that are operatively connected. The memory 814 can include one or more non-transitory computer-readable storage media, such as RAM, ROM, EEPROM, EPROM, flash memory devices, magnetic disks, etc., and combinations thereof. The memory 814 can store data 816 and instructions 818 which are executed by the processor 812 to cause the user computing device 802 to perform operations.

In some implementations, the user computing device 802 can store or include one or more machine-learned agentic orchestration models 820. For example, the agentic orchestration models 820 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). In some implementations, the agentic orchestration models 820 can be Large Foundational Models (LFMs) that are trained on large corpuses of training data to generate multimodal inputs (e.g., large language models, large vision models, large multimodal models, etc.). Example agentic orchestration models 820 are discussed with reference to FIGS. 1-6.

In some implementations, the one or more agentic orchestration models 820 can be received from the server computing system 830 over network 880, stored in the user computing device memory 814, and then used or otherwise implemented by the one or more processors 812. In some implementations, the user computing device 802 can implement multiple parallel instances of a single agentic orchestration model 820 (e.g., to perform parallel agentic orchestration across multiple instances of the agentic orchestration model 820).

Additionally or alternatively, one or more agentic orchestration models 840 can be included in or otherwise stored and implemented by the server computing system 830 that communicates with the user computing device 802 according to a client-server relationship. For example, the agentic orchestration models 840 can be implemented by the server computing system 830 as a portion of a web service (e.g., a cloud architecture design service). Thus, one or more models 820 can be stored and implemented at the user computing device 802 and/or one or more models 840 can be stored and implemented at the server computing system 830.

The user computing device 802 can also include one or more user input components 822 that receives user input. For example, the user input component 822 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 830 includes one or more processors 832 and a memory 834. The one or more processors 832 can be any suitable processing device (e.g., a processor core, a microprocessor, an ASIC, an FPGA, a controller, a microcontroller, etc.) and can be one processor or a plurality of processors that are operatively connected. The memory 834 can include one or more non-transitory computer-readable storage media, such as RAM, ROM, EEPROM, EPROM, flash memory devices, magnetic disks, etc., and combinations thereof. The memory 834 can store data 836 and instructions 838 which are executed by the processor 832 to cause the server computing system 830 to perform operations.

In some implementations, the server computing system 830 includes or is otherwise implemented by one or more server computing devices. In instances in which the server computing system 830 includes plural server computing devices, such server computing devices can operate according to sequential computing architectures, parallel computing architectures, or some combination thereof.

As described above, the server computing system 830 can store or otherwise include one or more agentic orchestration models 840. For example, the models 840 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 840 are discussed with reference to FIGS. 1-6.

The user computing device 802 and/or the server computing system 830 can train the models 820 and/or 840 via interaction with the training computing system 850 that is communicatively coupled over the network 880. The training computing system 850 can be separate from the server computing system 830 or can be a portion of the server computing system 830.

The training computing system 850 includes one or more processors 852 and a memory 854. The one or more processors 852 can be any suitable processing device (e.g., a processor core, a microprocessor, an ASIC, an FPGA, a controller, a microcontroller, etc.) and can be one processor or a plurality of processors that are operatively connected. The memory 854 can include one or more non-transitory computer-readable storage media, such as RAM, ROM, EEPROM, EPROM, flash memory devices, magnetic disks, etc., and combinations thereof. The memory 854 can store data 856 and instructions 858 which are executed by the processor 852 to cause the training computing system 850 to perform operations. In some implementations, the training computing system 850 includes or is otherwise implemented by one or more server computing devices.

The training computing system 850 can include a model trainer 860 that trains the machine-learned models 820 and/or 840 stored at the user computing device 802 and/or the server computing system 830 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 860 can perform a number of generalization techniques (e.g., weight decays, dropouts, etc.) to improve the generalization capability of the models being trained. In particular, the model trainer 860 can train the agentic orchestration models 820 and/or 840 based on a set of training data 862.

In some implementations, if the user has provided consent, the training examples can be provided by the user computing device 802. Thus, in such implementations, the model 820 provided to the user computing device 802 can be trained by the training computing system 850 on user-specific data received from the user computing device 802. In some instances, this process can be referred to as personalizing the model.

The model trainer 860 includes computer logic utilized to provide desired functionality. The model trainer 860 can be implemented in hardware, firmware, and/or software controlling a general purpose processor. For example, in some implementations, the model trainer 860 includes program files stored on a storage device, loaded into a memory and executed by one or more processors. In other implementations, the model trainer 860 includes one or more sets of computer-executable instructions that are stored in a tangible computer-readable storage medium such as RAM, hard disk, or optical or magnetic media.

The network 880 can be any type of communications network, such as a local area network (e.g., intranet), wide area network (e.g., Internet), or some combination thereof and can include any number of wired or wireless links. In general, communication over the network 880 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 8A illustrates one example computing system that can be used to implement the present disclosure. Other computing systems can be used as well. For example, in some implementations, the user computing device 802 can include the model trainer 860 and the training dataset 862. In such implementations, the models 820 can be both trained and used locally at the user computing device 802. In some of such implementations, the user computing device 802 can implement the model trainer 860 to personalize the models 820 based on user-specific data.

Figure 8B:
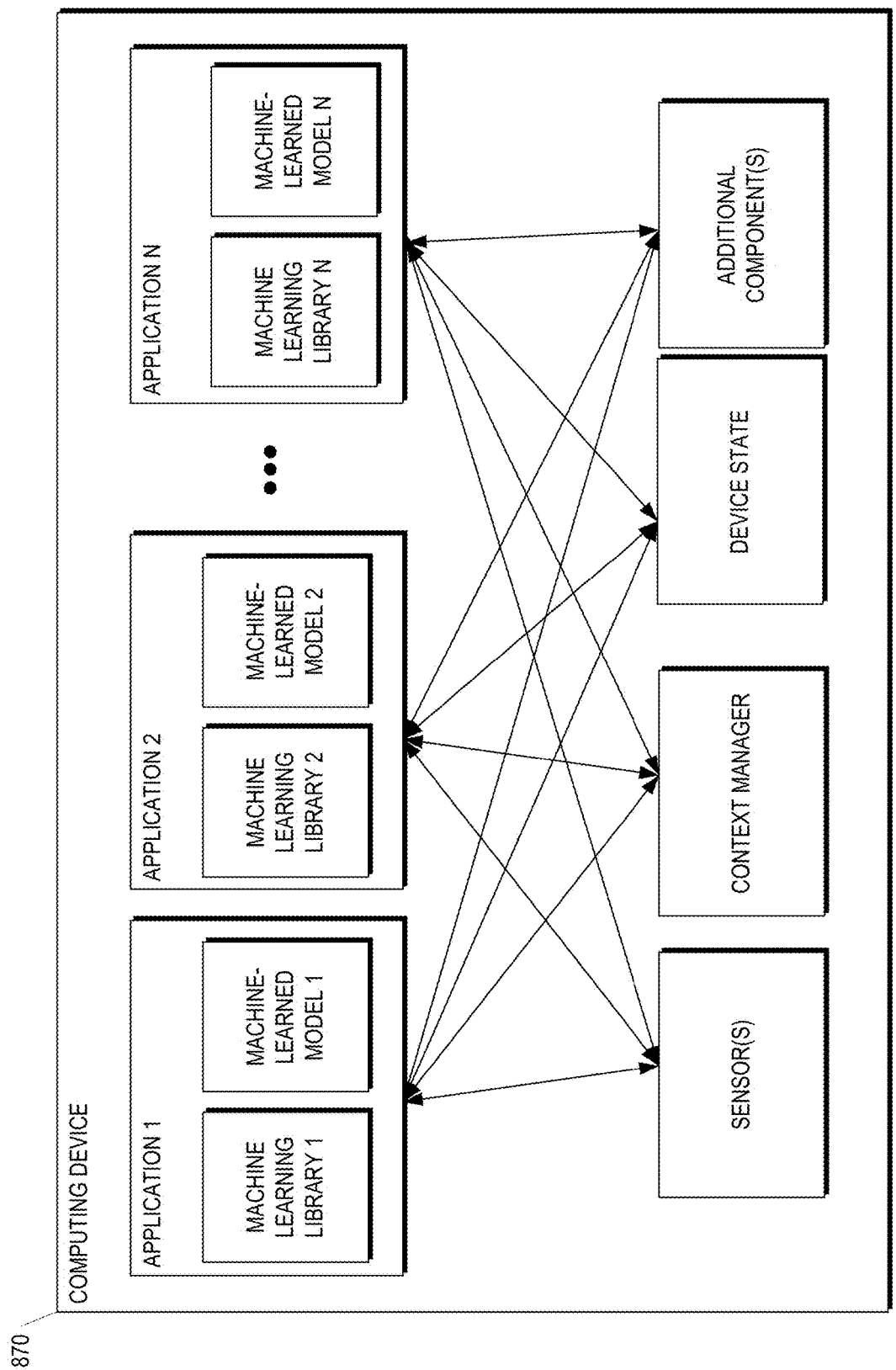
FIG. 8B depicts a block diagram of an example computing device that performs component selection for generic component placeholders for a proposed cloud architecture according to some implementations of the present disclosure.

FIG. 8B depicts a block diagram of an example computing device 870 that performs component selection for generic component placeholders for a proposed cloud architecture according to some implementations of the present disclosure. The computing device 870 can be a user computing device or a server computing device.

The computing device 870 includes a number of applications (e.g., applications 8 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 8B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 8C:
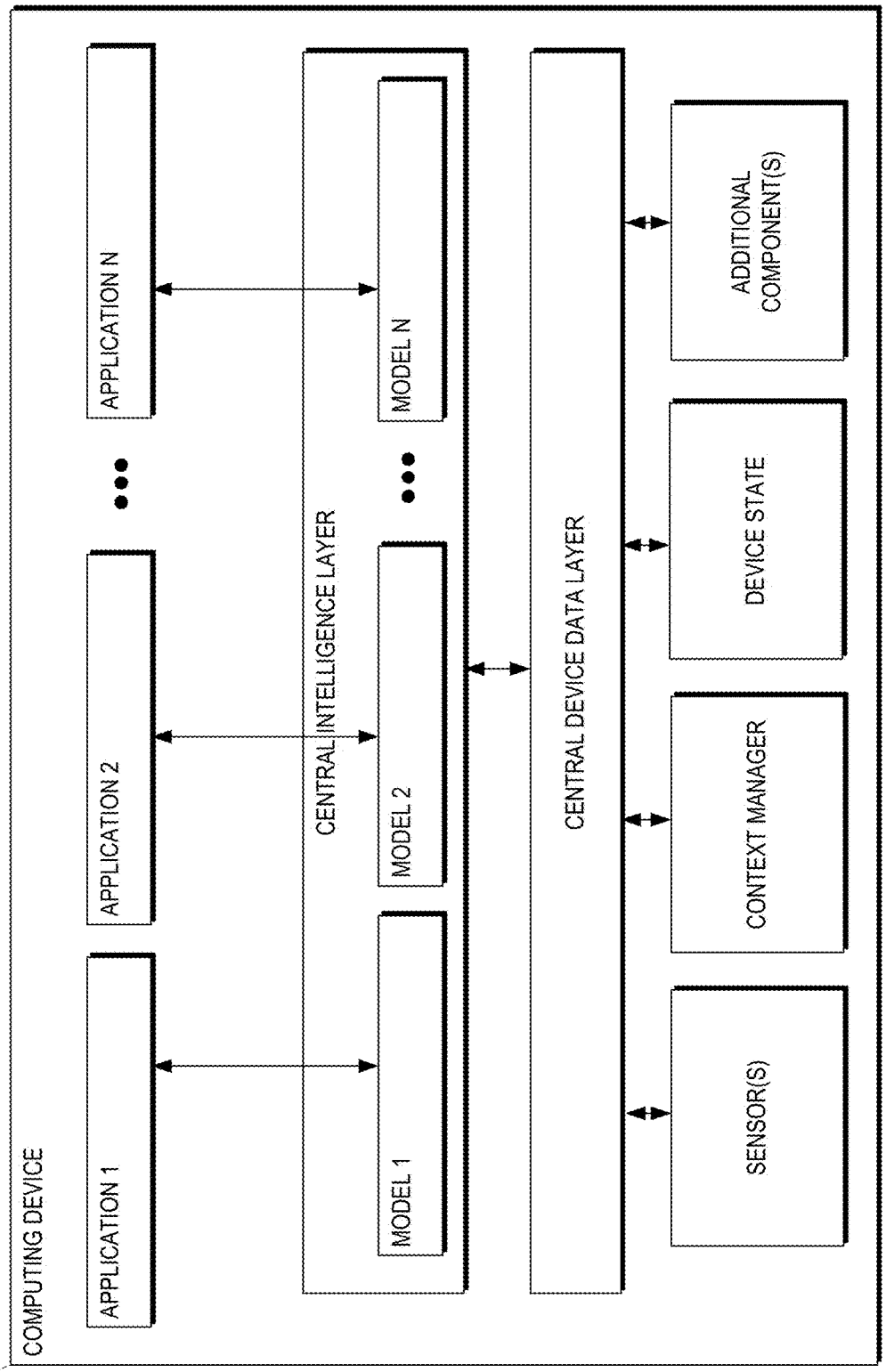
FIG. 8C depicts a block diagram of an example computing device that performs training and/or prompting of agentic orchestration models according to some implementations of the present disclosure.

FIG. 8C depicts a block diagram of an example computing device 875 that performs training and/or prompting of agentic orchestration models according to some implementations of the present disclosure. The computing device 875 can be a user computing device or a server computing device.

The computing device 875 includes a number of applications (e.g., applications 8 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 8C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 875.

The central intelligence layer can communicate with a central device data layer. The central device data layer can be a centralized repository of data for the computing device 875. As illustrated in FIG. 8C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method comprising:
    obtaining, by a computing system comprising one or more computing devices, a set of inputs comprising:
        user response information comprising information indicative of cloud architecture requirements for a cloud architecture to fulfill; and
        proposed architecture information indicative of a proposed cloud architecture comprising a plurality of proposed generic component placeholders for components necessary to meet the cloud architecture requirements;
    processing, by the computing system, the set of inputs with a plurality of agentic orchestration models to obtain a role output comprising component selection information indicative of a plurality of cloud components selected for the plurality of proposed generic component placeholders, wherein, for each of the plurality of proposed generic component placeholders, the component selection information selects a particular cloud component from a set of candidate cloud components, and wherein each of the plurality of agentic orchestration models comprises a machine-learned model prompted to fulfill a corresponding cloud architecting role of a plurality of cloud architecting roles; and
    based on the component selection information, providing, by the computing system, information indicative of the plurality of cloud components selected for the plurality of proposed generic component placeholders to a user device associated with the user response information.

2. The computer-implemented method of claim 1, wherein providing the information indicative of the plurality of cloud components comprises:

generating, by the computing system, control configuration information for the plurality of cloud components.

3. The computer-implemented method of claim 2, wherein providing the information indicative of the plurality of cloud components further comprises:
providing, by the computing system, the control configuration information to the user device associated with the user response information.

4. The computer-implemented method of claim 2, wherein the method further comprises:
causing, by the computing system, deployment of the cloud architecture based on the control configuration information.

5. The computer-implemented method of claim 4, wherein causing the deployment of the cloud architecture comprises:
using, by the computing system, the control configuration information to deploy each of the plurality of cloud components for the plurality of proposed generic component placeholders.

6. The computer-implemented method of claim 5, wherein the proposed architecture information is further indicative of a plurality of proposed interactions between the proposed generic component placeholders; and
wherein using the control configuration information to deploy each of the plurality of cloud components comprises:
configuring, by the computing system, the plurality of cloud components for interactions in accordance with the plurality of proposed interactions.

7. The computer-implemented method of claim 6, wherein the plurality of proposed interactions comprises an interaction between a first cloud component and a second cloud component of the plurality of cloud components; and
wherein configuring the plurality of cloud components for the interactions in accordance with the plurality of proposed interactions comprises:
configuring, by the computing system, the first cloud component and the second cloud component to communicate with each other.

8. The computer-implemented method of claim 7, wherein configuring the first cloud component and the second cloud component to communicate with each other further comprises:
configuring, by the computing system, the first cloud component and the second cloud component to restrict the first cloud component and the second cloud component from communicating with other cloud components of the plurality of cloud components.

9. The computer-implemented method of claim 1, wherein providing the information indicative of the plurality of cloud components further comprises:
providing, by the computing system, a visual representation of the component selection information to the user device associated with the user response information.

10. The computer-implemented method of claim 1, wherein processing the set of inputs with the plurality of agentic orchestration models to obtain the component selection information comprises:
processing, by the computing system, the set of inputs with a first agentic orchestration model of the plurality of agentic orchestration models to obtain a first role output comprising a first portion of the component selection information indicative of a first portion of the plurality of cloud components selected for the plurality of proposed generic component placeholders; and
processing, by the computing system, the set of inputs with a second agentic orchestration model of the plurality of agentic orchestration models to obtain a second role output comprising a second portion of the component selection information indicative of a second portion of the plurality of cloud components selected for the plurality of proposed generic component placeholders.

11. The computer-implemented method of claim 10, wherein the first role output is associated with a security cloud architecting role, and wherein the first portion of the plurality of cloud components comprises a firewall component.

12. The computer-implemented method of claim 11, wherein the first role output is associated with a database cloud architecting role, and wherein the first portion of the plurality of cloud components comprises a database component.

13. The computer-implemented method of claim 1, wherein obtaining the set of inputs further comprises:
obtaining, by the computing system, task selection information indicative of a particular task selected from a plurality of candidate tasks; and
wherein providing the information indicative of the plurality of cloud components selected for the plurality of proposed generic component placeholders comprises:
processing, by the computing system, the set of inputs and the task selection information with a particular agentic orchestration model to obtain a second role output associated with a developer role, wherein the particular agentic orchestration model is prompted to fulfill the developer role, and wherein the second role output comprises control configuration information.

14. The computer-implemented method of claim 13, wherein, prior to processing the set of inputs with the plurality of agentic orchestration models to obtain the role output, the method comprises:
selecting, by the computing system, the plurality of agentic orchestration models from a plurality of candidate agentic orchestration models based on the particular task selected from the plurality of candidate tasks.

15. The computer-implemented method of claim 14, wherein the plurality of candidate tasks comprises:
a component verification task; or
a visual representation task.

16. The computer-implemented method of claim 1, wherein, prior to obtaining the set of inputs, the method comprises:
obtaining, by the computing system, the user response information comprising the information indicative of the cloud architecture requirements for the cloud architecture to fulfill; based on the user response information, using, by the computing system, a prior set of agentic orchestration models to generate a respective plurality of prior role outputs, wherein one of the plurality of role outputs is indicative of the plurality of proposed generic component placeholders for the components necessary to meet the cloud architecture requirements; and
based on the plurality of role outputs, generating, by the computing system, a proposed architecture output comprising a visual representation of the proposed generic component placeholders.

17. A computing system, comprising:
one or more processor devices;
one or more tangible, non-transitory computer readable media storing computer-readable instructions that when executed by the one or more processor devices cause the computing system to perform operations, the operations comprising:
obtaining a set of inputs comprising:
user response information comprising information indicative of cloud architecture requirements for a cloud architecture to fulfill; and
proposed architecture information indicative of a proposed cloud architecture comprising a plurality of proposed generic component placeholders for components necessary to meet the cloud architecture requirements;
processing the set of inputs with a plurality of agentic orchestration models to obtain a role output comprising component selection information indicative of a plurality of cloud components selected for the plurality of proposed generic component placeholders, wherein, for each of the plurality of proposed generic component placeholders, the component selection information selects a particular cloud component from a set of candidate cloud components, and wherein each of the plurality of agentic orchestration models comprises a machine-learned model prompted to fulfill a corresponding cloud architecting role of a plurality of cloud architecting roles; and
based on the component selection information, generating control configuration information indicative of the plurality of cloud components selected for the plurality of proposed generic component placeholders.

18. The computing system of claim 17, wherein the user response information is descriptive of responses from a user to a cloud service questionnaire; and
wherein the operations further comprise:
providing a visual representation of the component selection information to a user computing device associated with the user.

19. The computing system of claim 17, wherein the operations further comprise:
causing deployment of the cloud architecture based on the control configuration information.

20. One or more tangible, non-transitory computer readable media storing computer-readable instructions that when executed by one or more processor devices cause the one or more processor devices to perform operations, the operations comprising:
obtaining a set of inputs comprising:
user response information comprising information indicative of cloud architecture requirements for a cloud architecture to fulfill; and
proposed architecture information indicative of a proposed cloud architecture comprising a plurality of proposed generic component placeholders for components necessary to meet the cloud architecture requirements;
processing the set of inputs with a plurality of agentic orchestration models to obtain a role output comprising component selection information indicative of a plurality of cloud components selected for the plurality of proposed generic component placeholders, wherein, for each of the plurality of proposed generic component placeholders, the component selection information selects a particular cloud component from a set of candidate cloud components, and wherein each of the plurality of agentic orchestration models comprises a machine-learned language model prompted to fulfill a corresponding cloud architecting role of a plurality of cloud architecting roles; and
based on the component selection information, generating configuration information indicative of the plurality of cloud components selected for the plurality of proposed generic component placeholders.

* * * * *